US007412559B2

(12) United States Patent
Stockdale et al.

(10) Patent No.: US 7,412,559 B2
(45) Date of Patent: Aug. 12, 2008

(54) HIGH PERFORMANCE BATTERY BACKED RAM INTERFACE

(75) Inventors: James W. Stockdale, Clio, NV (US); Steven G. LeMay, Reno, NV (US); Dwayne R. Nelson, Las Vegas, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 10/912,262

(22) Filed: Aug. 4, 2004

(65) Prior Publication Data

US 2005/0010738 A1 Jan. 13, 2005

Related U.S. Application Data

(62) Division of application No. 09/690,931, filed on Oct. 17, 2000, now Pat. No. 6,804,763.

(51) Int. Cl.
*G06F 12/00* (2006.01)

(52) U.S. Cl. ....................... 711/103; 711/161; 711/170; 463/43

(58) Field of Classification Search ................. 711/170, 711/171, 102, 103; 463/25, 29
See application file for complete search history.

(56) References Cited

U.S. PATENT DOCUMENTS 3,931,504 A 1/1976 Jacoby
4,430,728 A 2/1984 Beitel et al.
4,454,594 A 6/1984 Heffron et al.
4,607,844 A * 8/1986 Fullerton ..................... 463/24
4,948,138 A 8/1990 Pease et al.
5,274,827 A 12/1993 Haggerty et al.

(Continued)

FOREIGN PATENT DOCUMENTS

EP 1046996 10/2000

(Continued)

OTHER PUBLICATIONS

Levinthal, Adam and Barnett, Michael, "The Silicon Gaming Odyssey Slot Machine," Feb. 1997, Compon '97 Proceedings, IEEE San Jose, CA; IEEE Comput. Soc., pp. 296-301 (6 pages).

(Continued)

*Primary Examiner*—Donald Sparks
*Assistant Examiner*—Matthew Bradley
(74) *Attorney, Agent, or Firm*—Weaver Austin Villeneuve & Sampson LLP

(57) ABSTRACT

A disclosed gaming machine provides a gaming machine with a non-volatile memory storage device and gaming software that allows the dynamic allocation and de-allocation of memory locations in a non-volatile memory. The non-volatile memory storage devices interface to an industry standard peripheral component interface (PCI) bus commonly used in the computer industry allowing communication between a master gaming controller the non-volatile memory. The master gaming controller executes software for a non-volatile memory allocation system that enables the dynamic allocation and de-allocation of non-volatile memory locations. In addition, the non-volatile memory allocation system enables a non-volatile memory file system. With the non-volatile memory file system, critical data stored in the non-volatile memory may be accessed and modified using operating system utilities such as word processors, graphic utilities and compression utilities.

23 Claims, 13 Drawing Sheets

U.S. PATENT DOCUMENTS

| | | | | |
|---|---|---|---|---|
| 5,344,144 | A | 9/1994 | Canon | |
| 5,551,020 | A | 8/1996 | Flax et al. | |
| 5,625,819 | A * | 4/1997 | Hoffer, Jr. | 707/202 |
| 5,643,086 | A | 7/1997 | Alcorn et al. | |
| 5,680,570 | A | 10/1997 | Rantala et al. | |
| 5,761,647 | A | 6/1998 | Boushy | |
| 5,851,149 | A | 12/1998 | Xidos et al. | |
| 5,968,153 | A | 10/1999 | Wheeler et al. | |
| 5,971,851 | A | 10/1999 | Pascal et al. | |
| 6,065,148 | A | 5/2000 | Obermeier et al. | |
| 6,070,202 | A | 5/2000 | Minkoff et al. | |
| 6,099,408 | A | 8/2000 | Schneier et al. | |
| 6,104,815 | A | 8/2000 | Alcorn et al. | |
| 6,106,396 | A | 8/2000 | Alcorn et al. | |
| 6,149,522 | A | 11/2000 | Alcorn et al. | |
| 6,183,366 | B1 | 2/2001 | Goldberg et al. | |
| 6,205,548 | B1 | 3/2001 | Hasbun | |
| 6,253,374 | B1 | 6/2001 | Dresevic et al. | |
| 6,264,561 | B1 | 7/2001 | Saffari et al. | |
| 6,286,088 | B1 | 9/2001 | Campbell et al. | |
| 6,394,907 | B1 | 5/2002 | Rowe | |
| 6,412,053 | B2 | 6/2002 | Bonola | |
| 6,446,257 | B1 | 9/2002 | Pradhan et al. | |
| 6,449,687 | B1 | 9/2002 | Moriya | |
| 6,453,319 | B1 | 9/2002 | Mattis et al. | |
| 6,454,648 | B1 | 9/2002 | Kelly et al. | |
| 6,467,038 | B1 | 10/2002 | Piwonka et al. | |
| 6,471,591 | B1 | 10/2002 | Crumby | |
| 6,488,580 | B1 | 12/2002 | Robb | |
| 6,503,147 | B1 | 1/2003 | Stockdale et al. | |
| 6,589,119 | B1 | 7/2003 | Orus et al. | |
| 6,609,187 | B1 | 8/2003 | Merrell et al. | |
| 6,685,559 | B2 | 2/2004 | Luciano et al. | |
| 6,685,567 | B2 | 2/2004 | Cockerille et al. | |
| 6,704,851 | B2 | 3/2004 | Siebert | |
| 6,816,956 | B1 | 11/2004 | Benayon et al. | |
| 6,839,823 | B1 * | 1/2005 | See et al. | 711/171 |
| 6,863,608 | B1 | 3/2005 | LeMay et al. | |
| 6,866,586 | B2 | 3/2005 | Oberberger et al. | |
| 6,874,075 | B2 | 3/2005 | Jerding et al. | |
| 6,962,530 | B2 | 11/2005 | Jackson | |
| 2002/0016896 | A1 | 2/2002 | Siebert | |
| 2002/0026566 | A1 * | 2/2002 | Awada et al. | 711/162 |
| 2002/0049909 | A1 | 4/2002 | Jackson et al. | |
| 2004/0002379 | A1 | 1/2004 | Parrott et al. | |
| 2004/0147314 | A1 | 7/2004 | LeMay et al. | |
| 2005/0164795 | A1 | 7/2005 | Whitten et al. | |
| 2005/0192099 | A1 | 9/2005 | Nguyen et al. | |
| 2007/0011427 | A1 | 1/2007 | Nelson | |
| 2007/0174581 | A1 | 7/2007 | Nelson | |
| 2007/0207852 | A1 | 9/2007 | Nelson | |

FOREIGN PATENT DOCUMENTS

| | | |
|---|---|---|
| EP | 1 255 234 | 11/2002 |
| GB | 2308171 | 6/1997 |
| WO | WO0005652 | 2/2000 |

OTHER PUBLICATIONS

Intel Corporation, "Flash Memory PCI Add-in Card for Embedded Systems", Application Note: AP-758, Sep. 1997 (17 pages).

Dallas Semiconductor, "DS123: Flexible Non-volatile Controller with Lithium Battery Monitor," www.dalsemi.com, Nov. 1999 (12 pages).

U.S. Appl. No. 09/520,405 (28 pages).

Australian Office Action dated Sep. 30, 2005 from a Corresponding AU Application No. 79469/01 (4 pages).

European Search Report dated Nov. 20, 2006 from corresponding EP Application No. 03752329.7 (4 pages).

European Search Report dated Feb. 14, 2007 from corresponding EP Application No. 03752329.7 (4 pages).

European Search Report dated Nov. 20, 2006 from corresponding EP Application No. 03752329.7.

European Search Report dated Feb. 14, 2007 from corresponding EP Application No. 03752329.7.

U.S. Office Action dated Jan. 4, 2005 from corresponding U.S. Appl. No. 10/243,104 (8 pages) [IGT1P036X1].

U.S. Office Action dated Aug. 16, 2005 from corresponding U.S. Appl. No. 10/243,104 (11 pages) [IGT1P036X1].

U.S. Office Action dated Jan. 17, 2006 from corresponding U.S. Appl. No. 10/243,104 (18 pages) [IGT1P036X1].

Notice of Allowance dated May 12, 2006 and Allowed Claims from corresponding U.S. Appl. No. 10/243,104 (6 pages) [IGT1P036X1].

Notice of Allowance dated Jan. 5, 2007 and Allowed Claims from corresponding U.S. Appl. No. 11/517,743 (7 pages) [IGT1P036X1C1].

Notice of Allowance dated May 2, 2007 and Allowed Claims from corresponding U.S. Appl. No. 11/517,743 (4 pages) [IGT1P036X1C1].

U.S. Office Action dated May 4, 2007 from corresponding U.S. Appl. No. 11/517,743 (6 pages) [IGT1P036X1C1].

Notice of Allowance dated Aug. 1, 2007 and Allowed Claims from corresponding U.S. Appl. No. 11/517,743 (4 pages) [IGT1P036X1C1].

U.S. Office Action dated Jun. 5, 2007 from corresponding U.S. Appl. No. 11/729,407 (7 pages) [IGT1P036X1C2].

Notice of Allowance dated Aug. 24, 2007 and Allowed Claims from corresponding U.S. Appl. No. 11/729,407 (4 pages) [IGT1P036X1C2].

Russian Advisory Action dated Sep. 10, 2007 from related Russian Application No. 2005106847, 10 pgs. (IGT1P036X1RU).

Notice of Allowance dated Dec. 19, 2007 and Allowed Claims from corresponding U.S. Appl. No. 11/729,407 (9 pages) [IGT1P036X1C2].

Nelson et al., "Game Removal with Game History," U.S. Appl. No. 11/367,497 filed on Mar. 3, 2006 [IGT1P228].

* cited by examiner

HIGH PERFORMANCE BATTERY BACKED RAM INTERFACE

CROSS-REFERENCE TO RELATED APPLICATIONS

This application is a divisional application and claims priority under 35 U.S.C. § 120 from U.S. application Ser. No. 09/690,931 filed Oct. 17, 2000 now U.S. Pat. No. 6,804,763 naming Stockdale, et al. as inventors, and titled "HIGH PERFORMANCE BATTERY BACKED RAM INTERFACE," which is incorporated herein in its entirety and for all purposes.

BACKGROUND OF THE INVENTION

This invention relates to non-volatile storage for gaming machines such as slot machines and video poker machines. More particularly, the present invention relates to hardware and methods for providing battery backed random access memory on gaming machines.

As technology in the gaming industry progresses, the traditional mechanically driven reel slot machines are being replaced with electronic counterparts having CRT, LCD video displays or the like and gaming machines such as video slot machines and video poker machines are becoming increasingly popular. Part of the reason for their increased popularity is the nearly endless variety of games that can be implemented on gaming machines utilizing advanced electronic technology. In some cases, newer gaming machines are utilizing computing architectures developed for personal computers. These video/electronic gaming advancements enable the operation of more complex games, which would not otherwise be possible on mechanical-driven gaming machines and allow the capabilities of the gaming machine to evolve with advances in the personal computing industry.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including touch screens and button pads, to determine the wager amount and initiate game play. After game play has been initiated, the gaming machine determines a game outcome, presents the game outcome to the player and may dispense an award of some type depending on the outcome of the game.

To implement the gaming features described above on a gaming machine using a components utilized in the personal computer industry, a number of requirements unique to the gaming industry must be considered. One such requirement is the storage of critical game information. Traditionally, gaming machines have been designed to store critical game information such as general accounting information (e.g. credits input the gaming machine and credits dispensed from the gaming machine) and a state of a game being played on the gaming machine using a non-volatile memory storage device. For example, game state information stored in a non-volatile memory might include the state of game currently being played on the gaming machine as well as game history information on a number of previous games played on the gaming machine that may be recalled when a malfunction such as a power failure has occurred or when a player has a dispute with the outcome of a previous game played on the gaming machine. A battery backed random access memory (RAM) is an example of a non-volatile memory storage device used previously on many types of gaming machines.

The non-volatile memory storage device may be designed to store critical game information for long periods of time. The length of period of time may be dictated by the gaming jurisdiction where the gaming machine is operated. For example, a battery backed RAM storage device may be designed to store data for a minimum of five years and even as long as seven years without replacing or maintaining the battery. Thus, to limit the battery size, cost and maintenance requirements for long storage periods, electronic RAM memory hardware with a low power consumption is required.

A typical modern video gaming machine contains several devices such as the microprocessor, RAM memory, ROM memory, mass storage devices, video display controller, sound generation hardware, etc. which share commonality with commercially available devices designed for personal computers. The typical system architecture of a modern personal computer control chipset precludes the connection of memory devices to the system bus unless those devices adhere to the strict specifications of the memory controller. All currently available control chipsets on personal computers require the use of dynamic memory devices, such as traditional Dynamic Random Access Memory (DRAM) or Synchronous DRAM. These devices consume too much DC power to allow effective use of battery technology for data backup for critical data storage requirements lasting multiple years. Thus, to utilize hardware components designed in the personal computing industry in the gaming machine, non-volatile memory storage devices compatible with personal computing hardware are needed.

The preservation of critical game information also influences the design of gaming software executed on the gaming machine. Gaming software executed on gaming machines is designed such that critical game information is not easily lost or corrupted. Therefore, gaming software is designed to prevent critical data loss in the event of software bugs, hardware failures, power failures, electrostatic discharges or tampering with the gaming machine. The implementation of the software design in the gaming software to meet critical data storage requirements may be quite complex and may require extensive of use the non-volatile memory hardware.

Traditionally, in the gaming industry, game design and the game platform design have been performed by single entities. Thus, a single gaming machine manufacturer will usually design a game and then design and manufacture a gaming machine allowing play of the game. Further, for game design on a pre-existing gaming machine, game development is usually always performed by the manufacturer of the gaming machine. The approach of the gaming industry may be contrasted with the video game industry. In the video game industry, games for a particular video game platform are typically developed by many companies different from the company that manufactures the video game platform. One trend in the gaming industry is a desire to create a game development environment similar to the video gaming industry where outside vendors may provide games to a gaming machine.

Issues involving the security, the accessibility and the efficient use of the non-volatile memory on gaming machines provide a few barriers to opening up game development to outside vendors as well as to game development in general.

Traditionally, software designs for non-volatile memory utilization have used a fixed memory map approach where all of the required non-volatile memory needed to store critical data and perform critical operations are determined before the code is initialized on the gaming machine and remain fixed once the game is launched. The fixed memory approach may be inefficient because temporary non-volatile memory space, which may be required by many gaming software units for the temporary storage of data, is not used for other purposes when it is not being used by a particular gaming software unit. Typically, the amount non-volatile memory on a gaming machine is limited by the hardware requirements such as the power consumption. Thus, to ensure there is enough of the limited non-volatile memory available on the gaming machine, a game designer must be aware of all of the non-volatile memory requirements needed by the different elements of the gaming machine software and not just those utilized for the presentation of game. This requirement is a barrier to an open game design environment and, in general, slows down the game development process.

Another limitation of the fixed non-volatile memory approach is the difficulty of modifying the fixed non-volatile memory map to install new software. When a software installation requires a different amount of memory in different locations than what is available with the current fixed map on the gaming machine, the non-volatile memory is usually re-initialized to generate a new fixed map. The re-initialization of the non-volatile memory destroys all critical data stored in the non-volatile memory and is also time consuming which is undesirable to the gaming machine operator. Thus, a deployment of a new game on a gaming machine is usually an infrequent occurrence. In contrast, in the video game industry, games are frequently and easily deployed on any given platform.

Another barrier to game development and an open game development environment is the accessibility of the non-volatile memory. Currently, gaming machine software development tools do not provide easy or standard methods for allocating and determining the contents of the non-volatile memory. These deficiencies make producing error free software involving the non-volatile memory more difficult and may be deterrent to many game designers.

Finally, the fixed memory approach for non-volatile memory may be infeasible for an open game development environment because of security issues. In the fixed memory approach, it is undesirable to provide the locations in memory where critical data is stored because it increases the potential for tampering with the gaming machine. For instance, a person might alter a non-volatile memory location to illegally obtain a jackpot. Thus, for security reasons, it would be undesirable to use a fixed memory approach in an open game development environment because the locations of critical data in the non-volatile memory would have to be openly shared.

In view of the above, to improve the game development process for gaming machines, it would be desirable to provide a more accessible, less complicated, more secure and more efficient methods and apparatus of providing non-volatile memory hardware and software on a gaming machine.

SUMMARY OF THE INVENTION

This invention addresses the needs indicated above by providing a gaming machine with a non-volatile memory storage device and gaming software that allows the dynamic allocation and de-allocation of memory locations in a non-volatile memory. The non-volatile memory storage devices interface to an industry standard peripheral component interface (PCI) bus commonly used in the computer industry allowing communication between a master gaming controller and the non-volatile memory. The master gaming controller executes software for a non-volatile memory allocation system that enables the dynamic allocation and de-allocation of non-volatile memory locations. In addition, the non-volatile memory allocation system enables a non-volatile memory file system. With the non-volatile memory file system, critical data stored in the non-volatile memory may be accessed and modified using operating system utilities such as text processors, graphic utilities and compression utilities.

One aspect of the present invention provides a gaming machine with a non-volatile storage device. The gaming machine may be generally characterized as including a: 1) a master gaming controller controlling one or more games played on the gaming machine where the game played on the gaming machine is selected from the group consisting of video poker, video black jack, video pachinko, video slots, video pachinko and mechanical slots, 2) a PCI bus for communication between the master gaming controller and one or more devices connected to the PCI bus, 3) a non-volatile memory storage device that communicates with the master gaming controller via the PCI bus and 4) a non-volatile memory allocation system executed by the master gaming controller wherein the non-volatile memory allocation system dynamically allocates and de-allocates non-volatile memory locations in non-volatile memory located in the non-volatile memory storage device. In specific embodiments, the non-volatile memory is selected from the group consisting of battery-backed SRAM and flash memory where the non-volatile memory stores between about 1 Megabytes and 32 Megabytes of data. The one or more devices connected to the PCI bus may be selected from the group consisting of a gaming system extension, an audio controller and a network controller.

In specific embodiments, the gaming machine may include a main communication interface allowing communication with one or more devices located outside of the gaming machine such that the one or more devices located outside the gaming machine retrieve data stored in the non-volatile memory locations. Using the main communication interface, the gaming machine may be connected to a casino area network and a wide area progressive network. The gaming machine may also include a battery having sufficient energy to power the non-volatile storage device for at least 4 years where the non-volatile memory locations in the non-volatile storage device store critical data. Thus, information stored in the non-volatile memory locations such as critical data is preserved by the power from a battery when the gaming machine loses power. The critical data is selected from the group consisting of game history information, security information, accounting information, player tracking information, wide area progressive information, game state information or any critical game related data.

In another embodiment, the gaming machine may include a non-volatile memory file system where memory locations in the non-volatile memory correspond to one or more files and one or more directories in the non-volatile memory file system. The one or more files may contain critical data. The contents of the one or more files in the non-volatile memory file system may be accessed using a word processor, graphics utility program or other applications that need access to data contained in "files". Further, a main display connected to the gaming machine may be used to display the files and directories in the non-volatile memory file system.

Another aspect of the present invention provides a non-volatile memory storage device for storing critical data in a non-volatile memory on a gaming machine with a master gaming controller. The non-volatile memory storage device may be generally characterized as including: 1) an interface device that receives data signals from the master gaming controller in a first format and converts the data signals to one or more second formats different from said first format where the interface device may be a PCI interface device, 2) a NV-RAM controller that receives data signals in said second format from the interface device and controls access to the non-volatile memory, 3) one more non-volatile memory chips comprising the non-volatile memory that receive data signals from the interface device in the second format and store the critical data contained in the data signals in one or more memory locations on the non-volatile memory chips where the non-volatile memory chips may be battery-backed RAM or flash memory and 4) a battery that provides power to the NV-RAM controller where the battery may be a lithium battery. In specific embodiments, the non-volatile memory may utilize between about 1 and 16 non-volatile memory chips where the non-volatile memory stores between about 1 Megabytes and 32 Megabytes of critical data. Also, the master gaming controller may execute a non-volatile memory allocation system on the non-volatile memory where the non-volatile memory allocation system dynamically allocates and de-allocates memory locations in the non-volatile memory.

In another embodiment, the NV-RAM controller may monitor a battery voltage level and a power supply voltage level. The NV-RAM controller may limit access to the non-volatile memory when the power supply voltage level drops below a power supply cut-off voltage level. The power cut-off voltage level may be between about 4.25 Volts and 4.5 Volts. Further, the NV-RAM controller may select a power supply source for the non-volatile memory according to the power supply voltage level. For instance, the NV-RAM controller may select a battery power supply source for the non-volatile memory when the power supply voltage level drops below the power supply cut-off voltage. The NV-RAM controller may also direct data contained in the data signals to one of the memory chips.

Another aspect of the invention provides a method of accessing a non-volatile memory on a gaming machine with a master gaming controller and a non-volatile storage device where the non-volatile storage device includes an interface device, an NV-RAM controller, a battery and a non-volatile memory. The method may be characterized as including: 1) receiving a data signal from the master gaming controller in a first format at the interface device, 2) converting the data signal to a second format within the interface device, 3) sending the data signal in the second format to the NV-RAM controller and the non-volatile memory, 4) monitoring the power supply voltage level in the NV-RAM controller and 5) limiting access to the non-volatile memory when the power supply voltage level monitored in the NV-RAM controller drops below a power supply voltage cut-off level. In one embodiment, the method may also include one or more of the following: i) storing critical data contained in the data signal in the non-volatile memory, ii) retrieving critical data stored in the non-volatile memory, iii) sending the critical data in data signals in the second format to the interface device, iv) converting the data signals in the second format to data signals in the first format at the interface device, and v) sending the data signals in the first format to the master gaming controller. In another embodiment, the method may include a) monitoring a battery voltage level, b) when the battery voltage level drops below a battery voltage cut-off level, sending a message to the master gaming controller containing a status of the battery, c) selecting a power supply source for the non-volatile memory according to the power supply voltage level, d) when the power supply voltage level drops below a power supply cut-off voltage, selecting the battery as the power supply source for the non-volatile memory and e) decoding an address corresponding to a memory location in the non-volatile memory contained in the data signal in the first format in the interface device.

Another aspect of the present invention provides a method of allocating non-volatile memory locations on a gaming machine containing a master gaming controller executing gaming software comprising one or more clients, a non-volatile memory allocation system and a state-based transaction system. The method may be characterized as including 1) receiving a request at the non-volatile memory system from the client to allocate a block of non-volatile memory locations in the non-volatile memory for critical data transactions in the state-based transaction system, 2) assigning a node to the block of non-volatile memory, 3) creating an NV-RAM node record, 4) assigning a pointer to a heap block and 5) sending a handle corresponding to the block of non-volatile memory to the client where the handle allows the client to subsequently access the non-volatile memory using the non-volatile memory access system. The method may include one or of the following: a) adding the assigned node to an NV-RAM node record list, b) updating a volatile memory look-up list, c) determining an amount of memory available in the non-volatile memory, d) comparing the amount of memory available in the non-volatile memory with an amount of non-volatile memory in the requested block, e) when the amount of requested non-volatile memory exceeds the available amount of non-volatile memory, terminating the non-volatile memory request and f) sending critical data with the non-volatile memory allocation request to the non-volatile memory allocation system.

In specific embodiments, the method may include generating a signature for the NV-RAM node record where the signature is generated using a method selected from the group consisting of a CRC, Checksum, a hash value or other signature generating method. The NV-RAM record may include a handle, an owner handle, a name, a size, a pointer to the heap block, one or more status flags and a signature. The one or more status flags may be selected from the group consisting of a time stamp, an access restriction and a resizing restriction.

Another aspect of the present invention provides a method of modifying previously allocated non-volatile memory locations on a gaming machine containing a master gaming controller executing gaming software which may include one or more clients and a non-volatile memory allocation system. The method may be characterized as including: 1) receiving a function request at the non-volatile memory system from the client wherein the function request includes a handle corresponding to the allocated memory locations and a one or more function request modifiers, 2) locating the NV-RAM node record corresponding to the handle, 3) checking the status flags contained in the NV-RAM node record and 4) when the status flags allow the function request, executing the function request. The function request may be selected from the group consisting of de-allocate, open, close, read, read/directory, write, resize, move, get statistics, change statistics or other potential file related activities and the function request modifier is selected from the group consisting of a requested size, a name, a modification restriction, an access restriction, an owner and a time stamp. In a specific embodiment, the method may include: a) when the function request is a de-allocate function request, b) removing the NV-RAM node record, c) updating an NV-RAM record list and d) updating a heap block and e) updating a volatile memory look-up list.

Another aspect of the present invention provides a method of installing a new client requiring non-volatile memory into the gaming software on a gaming machine containing a master gaming controller executing gaming software comprised of one or more clients and a non-volatile memory allocation system. The method may be characterized as including: 1) determining an amount of non-volatile memory required by the new client, 2) sending an allocation function request to the non-volatile memory allocation system requesting the required amount of non-volatile memory, 3) receiving a handle from the non-volatile memory allocation system wherein the handle allows subsequent access to the requested non-volatile memory, 4) executing the client and 5) sending the handle to the new client. In addition, the method may include: a) determining when the required amount of non-volatile is available in the non-volatile memory and b) when the required amount of memory is not available, sending an error message. In a specific embodiment, the method may include loading a software load manager that manages an installation of the new client.

Another aspect of the present invention provides a method of storing and accessing critical data using a non-volatile memory file system on a gaming machine with a non-volatile memory storing critical data. The method may be generally characterized as including: 1) organizing blocks of memory locations in the non-volatile memory as files in the non-volatile memory file system, 2) storing the files under one or more directories, 3) selecting a first file and 4) accessing critical data stored in the first file using an operating system utility program where the operating system utility program is selected from the group consisting of a word processor and a graphical utility program. The critical data may be selected from the group consisting of game history information, security information, accounting information, player tracking information, wide area progressive information and game state information.

In specific embodiments, the method may include: a) applying a non-volatile memory file system command to the file and directories in the non-volatile memory file system where the non-volatile file system commands include renaming, moving, adding and deleting the file and directories in the non-volatile memory file system, b) displaying the files and directories in the non-volatile memory file system and critical data contained in the one or more files on a display connected to the gaming machine, c) modifying the critical data contained in the one or more files using a word processor or other text/data editor, d) compressing the critical data contained in the one or more files in the non-volatile memory file system using an operating system compression utility and e) setting an access privilege to one or more files and directories in the non-volatile memory file system.

Another aspect of the present invention provides a method of recovering a state of the gaming machine after power is lost on a gaming machine containing a master gaming controller executing gaming software comprising one or more clients and a non-volatile memory allocation system. The method may be characterized as including: 1) activating the non-volatile-memory allocation system, 2) comparing one or more data signatures, 3) determining a status of an operation that was being performed by the non-volatile memory when the power was lost and 4) when the status indicates the operation is incomplete, completing the operation. In addition, the method may include one or more of the following: a) generating one or more data signatures, b) when the one or more data signatures do not compare, sending an error message, c) building a node look-up list in volatile memory and undoing the operation and returning the gaming machine to the state prior to the operation.

Another aspect of the present invention provides a gaming machine storing critical data. The gaming machine may be characterized as including: 1) a master gaming controller controlling one or more games played on the gaming machine, 2) a non-volatile memory storage device storing critical data from the one or more games played on the gaming machine, 3) gaming software comprising one or more clients executed by the master gaming controller and 4) a non-volatile memory allocation system allocating and modifying non-volatile memory locations in the non-volatile memory storage device based upon function requests from the one or more clients where the clients may be selected from the group consisting of a bank manager, a communication manager, a virtual player tracking unit, an event manager. In addition the gaming machine may include a non-volatile memory file system where files in the non-volatile memory file system may contain critical data stored in the non-volatile memory locations.

These and other features of the present invention will be presented in more detail in the following detailed description of the invention and the associated figures.

DESCRIPTION OF THE PREFERRED EMBODIMENTS

Figure 1:
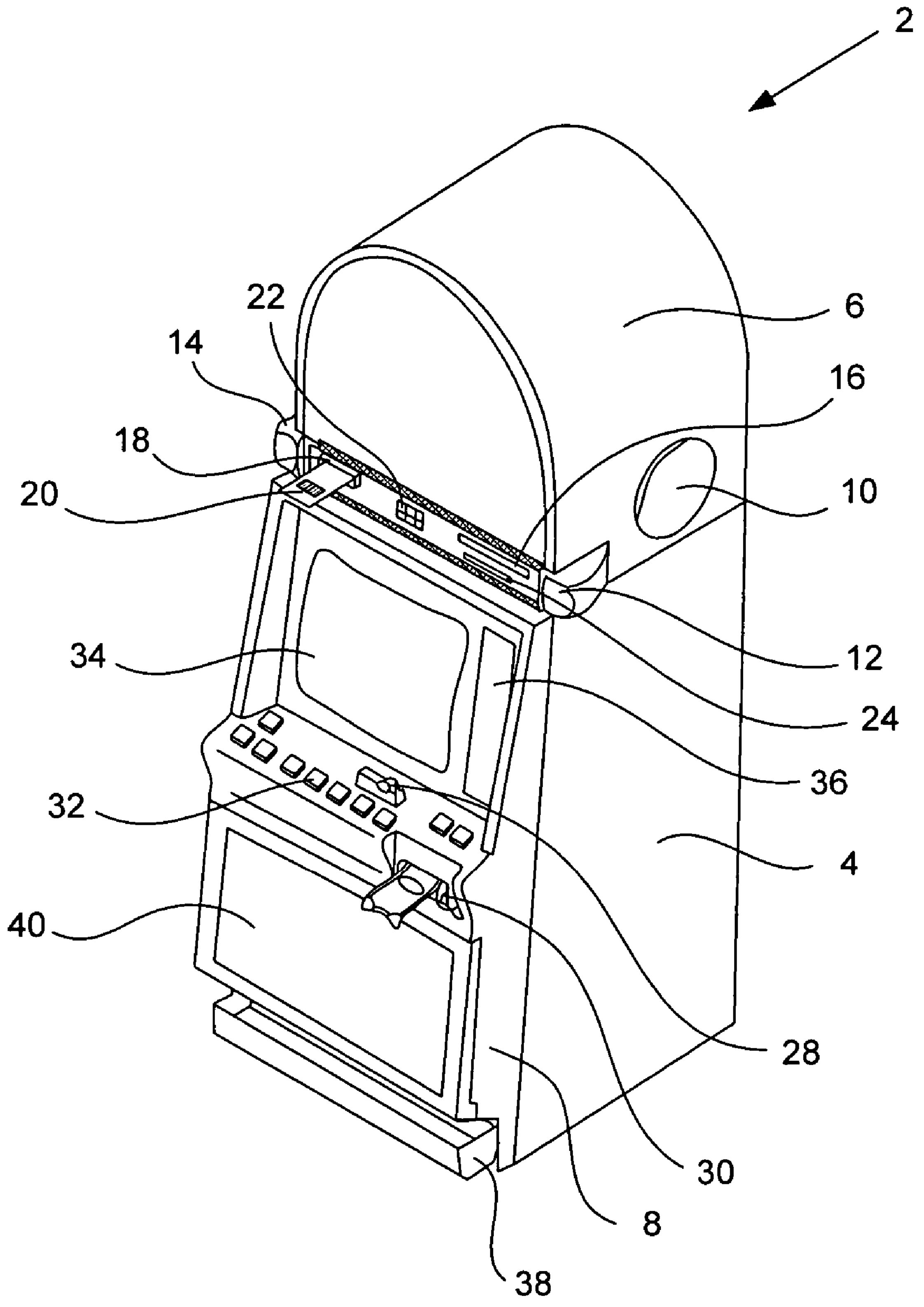
FIG. 1 is a perspective drawing of a gaming machine having a top box and other devices.

Turning first to FIG. 1, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, the number of coins played. Many possible games, including traditional slot games, video slot games, video poker, and keno, may be provided with gaming machines of this invention.

The bill validator 30, coin acceptor 28, player-input switches 32, video display monitor 34, and information panel are devices used to play a game on the game machine 2. The devices are controlled by circuitry (See FIG. 3) housed inside the main cabinet 4 of the machine 2. In the operation of these devices, critical information may be generated that is stored within a non-volatile memory storage device 355 (See FIG. 3) located within the gaming machine 2. For instance, when cash or credit of indicia is deposited into the gaming machine using the bill validator 30 or the coin acceptor 28, an amount of cash or credit deposited into the gaming machine 2 may be stored within the non-volatile memory storage device 355. As another example, when important game information, such as the final position of the slot reels in a video slot game, is displayed on the video display monitor 34, game history information needed to recreate the visual display of the slot reels may be stored in the non-volatile memory storage device. The type of information stored in the non-volatile memory may be dictated by the requirements of operators of the gaming machine and regulations dictating operational requirements for gaming machines in different gaming jurisdictions. In the description that follows, hardware and methods for storing critical game information in a non-volatile storage device are described within the context of the operational requirements of a gaming machine 2.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information and a card reader 24 for entering a magnetic striped card containing player tracking information. Further, the top box 6 may house different or additional devices than shown in the FIG. 1. For example, the top box may contain a bonus wheel or a back-lit silk screened panel which may be used to add bonus features to the game being played on the gaming machine. During a game, these devices are controlled and powered, in part, by the master gaming controller housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. Those of skill in the art will understand that the present invention, as described below, can be deployed on most any gaming machine now available or hereafter developed.

Returning to the example of FIG. 1, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit. During the game, the player typically views game information and game play using the video display 34.

During the course of a game, a player may be required to make a number of decisions, which affect the outcome of the game. For example, a player may vary his or her wager on a particular game, select a prize for a particular game, or make game decisions which affect the outcome of a particular game. The player may make these choices using the player-input switches 32, the video display screen 34 or using some other device which enables a player to input information into the gaming machine. Certain player choices may be captured by player tracking software 224 (See FIG. 2) loaded in a memory inside of the gaming machine. For example, the rate at which a player plays a game or the amount a player bets on each game may be captured by the player tracking software. The player tracking software 224 may utilize the non-volatile memory storage device 355 to store this information.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive coins or game tokens from the coin tray 38 or the ticket 20 from the printer 18, which may be used for further games or to redeem a prize. Further, the player may receive a ticket 20 for food, merchandise, or games from the printer 18.

Figure 2:
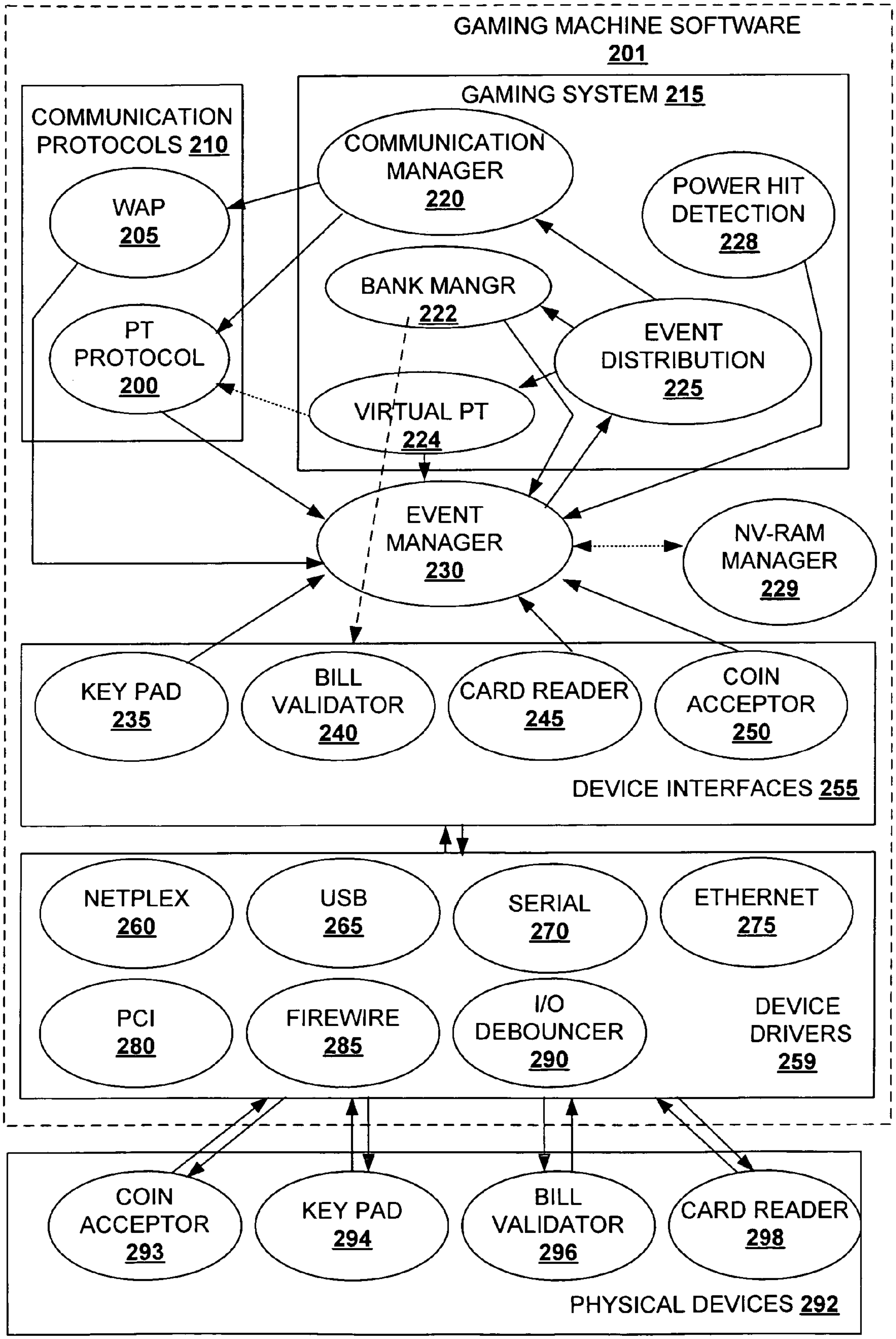
FIG. 2 is a block diagram depicting gaming machine software elements including a NV-memory manager for one embodiment of a gaming system software architecture.

Various hardware and software architectures may be used to implement this invention. FIG. 2 is a block diagram depicting one suitable example of gaming machine software elements in a gaming machine with a software architecture 201 employing a NV-RAM manager 229 to access a physical non-volatile memory storage device 335 described with reference to FIGS. 3, 4 and 5. The NV-RAM manager 229 controls access to the non-volatile memory on the gaming machine. The NV-RAM manager is a "process" executed by an operating system residing on the gaming machine. A "process" is a separate software execution unit that is protected by the operating system executed by the microprocessor 300 (See FIG. 3). When a process, including the NV-RAM manger 229, is protected, other software processes or software units executed by the master gaming controller can not access the memory of the protected process. The operating system may be one of a number of commercially available operating systems, such as Windows NT by Microsoft Corporation of Redmond, Wash. The operating system may include standard utilities for accessing and manipulating files and directories accessible to the system.

The NV-RAM manager 229 is a protected process on the gaming machine to maintain the integrity of the non-volatile memory space on the gaming machine. All access to the non-volatile memory is through the NV-RAM manager 229.

During execution of the gaming machine software 201, the non-volatile manager 229 may receive access requests via the event manager 230 from other processes including a virtual player tracking unit 224, a bank manager 222 and one or more device interfaces 255 to store or retrieve data in the physical non-volatile memory space. Other software units that request to read, write or query blocks of memory in the non-volatile memory are referred to clients.

The NV-RAM manager 229 processes the access requests from the clients including allocating and de-allocating memory in the NV-RAM and checking for various errors. The space allocated by the NV-RAM manager 229 in the NV-RAM may be temporary or permanent. Temporary space may be used to process important commands regarding the "state" of the gaming machine. After the commands are processed, the temporary space may be allocated for other purposes. Permanent space may be used to store important data on the gaming machine including accounting information and a game history containing a record of previous game outcomes that may be utilized for dispute resolution on the gaming machine. Examples of client access to the NV-RAM including the allocation and de-allocation of memory is described in the following description with reference to FIG. 2. The layout of the temporary space and the permanent space in the NV-RAM may be represented in the software as a file system. Details of a non-volatile memory allocation system and non-volatile memory file system are described with reference to FIG. 9-12.

The capability to allocate and de-allocate memory in the physical NV-RAM differs from past implementations of non-volatile storage on gaming machines. In the past, the NV-RAM was treated as large blocks of memory. The software structure of the memory was determined during development as part of the compiling and linking process providing a fixed map of the NV-RAM memory. The fixed memory approach tends to lead to inefficient utilization of the NV-RAM because all of the NV-RAM requirements are determined in advance. Determining the non-volatile memory requirements in advance may be inefficient because exact requirements are usually unknown. Thus, more memory may be allocated than is actually needed in most situations. Efficient NV-RAM memory utilization is important because the size of the NV-RAM is limited by power requirements. In addition, when software is added to the gaming machine with different NV-RAM requirements (e.g. an upgrade), the NV-RAM must be reinitialized to create a new memory map since the software structure (map) of the memory is fixed after compiling. Reinitializing the NV-RAM clears away all of the information stored in NV-RAM which is usually undesirable in the gaming industry. Further, the fixed map may create security issues because the location where critical data is stored in the gaming machine is fixed. Thus, to tamper with the gaming machine, a person may illegally determine where the critical information is stored such that these locations may be later altered in attempt to tamper with the gaming machine. Advantages of employing an NV-RAM manager 229 that allows the dynamic allocation and de-allocation of NV-RAM are 1) more efficient use of the memory because memory requirements do not need to be known prior to compiling of the software, 2) the ability to load software requiring NV-RAM such as upgrades without reinitializing the NV-RAM and 3) increased security because the storage locations in NV-RAM may be regularly changed.

For error checking, the NV-RAM manager, uses access protocols and a distinct file system (described with reference to FIGS. 9, 10, 11 and 12) to check the client's NV-RAM access request to ensure the request does not corrupt the data stored in the non-volatile memory space or the request does not return corrupted data. For example, the NV-RAM manager 229 checks read and write requests to insure the client does not read or write data beyond a requested block size. In the past, a software errors from numerous software units may have resulted in the corruption of the non-volatile memory space because clients were able to directly access the NV-RAM. When the non-volatile memory space is corrupted (e.g. critical data is accidentally overwritten), often the entire physical NV-RAM memory is reinitialized and all the critical stored on the gaming machine is lost. Using the NV-RAM manager 229 to check all accesses to the physical non-volatile memory, many of types of data corruption scenarios may be avoided.

With the non-volatile memory protected from invalid reads and writes by the NV-RAM manager 229, a critical data layer can be built using the client access protocols to the non-volatile memory storage device 355. Critical data is a specific term used in the gaming industry to describe information that is stored in the non-volatile memory storage device 355 and is critical to the operation and record keeping in the gaming machine. Critical data is stored in non-volatile memory using strict error checking to catch errors due to software problems, hardware failures, electrostatic discharge and tampering. An operational requirement for gaming machines is that critical data is never left in an invalid state. Therefore, the gaming software is designed to always know the state of the critical data such that the critical data is not left in an invalid state with an unknown status. For instance, when data caching is used to store data to another location, the gaming machine software may not be able to determine during certain periods whether the data remains in the cache or whether it has been copied to another location. While the state of the data in cache remains unknown, the data is in an invalid state. When critical data is stored, the requirement of avoiding invalid states includes the scenario where critical data is being modified and the power to the gaming machine is lost. To handle these requirements, the NV-RAM manager 229 may be used with a state-based software transaction system.

In one embodiment of a state-based software transaction system, the gaming machine software 201 defines a state. A state is critical data that contains a state value, critical data modifiers and substates. The state value is an integer value that has meaning to the user of the state. The critical data modifiers are types of critical data that store information about how to modify critical data. Substates are states themselves, but are linked to the state.

The critical data modifiers may be stored and associated with the state using a list. Typically, the critical data modifiers may be grouped to form a list of critical data transactions. A critical data transaction is usually comprised of one or more critical data modifiers. For instance, a critical data transaction to print an award ticket might comprise the operations of 1) start using printer, 2) disable hopper and 3) decrement the credits on the gaming machine by the amount printed to the award ticket where each operation is comprised of one or more critical data modifiers. The list is maintained as critical data to ensure that the items on the list are always valid i.e. the list may not be lost in the event of a power failure or some other gaming machine malfunction. All the transactions in a list for a state are completed or all the transactions are not completed which is a standard transaction technique.

The critical data transactions are a description of how to change critical data. The transactions are executed by the NV-RAM manager 229 after requests by clients. The list is built until the gaming machine software 201 executes the list by changing the state value which is the mechanism for initiating a transaction. If power is lost to the gaming machine during a transaction, the transaction can be completed due to the design of the state. On power recovery, the gaming machine can determine what state it was in prior to the power failure and then execute the critical data transactions listed in the state until the transactions are completed. For a given state, once the critical data transactions listed in the state are complete, the information describing the critical data transactions comprising the state may be discarded from the non-volatile memory and the gaming machine software may begin execution of the next state.

One feature of the state based transaction system using the non-volatile memory is that the gaming system software 215 may determine when a rollback is required. Once a list of critical data transactions is built as part of state, the transactions may be executed or rolled back. A rollback occurs when the entire list of critical data transactions is discarded and operations specified in the transactions are not executed. The state-based transaction based system is designed such that it is not possible for only a portion of the list of transactions in a state to be performed i.e. the entire list of transactions in the state may either be rolled back or executed. This feature of the state-based system tends to improve the software reliability and capability because errors due to the partial execution of states do not have to be considered in the software design. It also allows for faster software development.

Returning to FIG. 2, many game states involving critical data transactions involving the NV-RAM manager 229 and the physical NV-RAM 355 are generated in the context of the operation of the gaming machine software 201. Details of the gaming machine software 201 and examples of critical data transactions are described in the following paragraphs. The main parts of the gaming machine software 201 are communication protocols 210, a gaming system 215, an event manager 230, device interfaces 255, and device drivers 259. These software units comprising the gaming machine software 201 are loaded into memory of the master gaming controller of the gaming machine at the time of initialization of the gaming machine.

The device drivers 259 communicate directly with the physical devices including a coin acceptor 293, a key pad 294, a bill validator 296, a card reader 298 or any other physical devices that may be connected to the gaming machine. The device drivers 259 utilize a communication protocol of some type that enables communication with a particular physical device. The device driver abstracts the hardware implementation of a device. For example, a device drive may be written for each type of card reader that may be potentially connected to the gaming machine. Examples of communication protocols used to implement the device drivers 259 include Netplex 260, USB 265, Serial 270, Ethernet 275, Firewire 285, I/O debouncer 290, direct memory map, serial, PCI 280 or parallel. Netplex is a proprietary IGT standard while the others are open standards. For example, USB is a standard serial communication methodology used in the personal computer industry. USB Communication protocol standards are maintained by the USB-IF, Portland, Oreg., http://www.usb.org.

The device drivers may vary depending on the manufacturer of a particular physical device. For example, a card reader 298 from a first manufacturer may utilize Netplex 260 as a device driver while a card reader 298 from a second manufacturer may utilize a serial protocol 270. Typically, only one physical device of a given type is installed into the gaming machine at a particular time (e.g. one card reader). However, device drivers for different card readers or other physical devices of the same type, which vary from manufacturer to manufacturer, may be stored in memory on the gaming machine. When a physical device is replaced, an appropriate device driver for the device is loaded from a memory location on the gaming machine allowing the gaming machine to communicate with the device uniformly.

The device interfaces 255, including a key pad 235, a bill validator 240, a card reader 245, and a coin acceptor 250, are software units that provide an interface between the device drivers and the gaming system 215. The device interfaces 255 may receive commands from the software player tracking unit 224 or software units requesting an operation for one of the physical devices. For example, the bank manager 222 may send a command to the card reader 245 requesting a read of information of a card inserted into the card reader 298. The dashed arrow from the bank manager 222 to the device interfaces 255 indicates a command being sent from the bank manager 222 to the device interfaces 255. The card reader device interface 245 may sends the message to the device driver for the card reader 298. The device driver for the physical card reader 298 communicates the command and message to the card reader 298 allowing the card reader 298 to read information from a magnetic striped card or smart card inserted into the card reader.

The information read from the card inserted into to the card reader may be posted to the event manager 230 via an appropriate device driver 259 and the card reader device interface 245. The event manager 230 is typically a shared resource that is utilized by all of the software applications in the gaming system 215 including the virtual player tracking system 224 and the bank manager 222. The event manager 230 evaluates each game event to determine whether the event contains critical data or modifications of critical data that are protected from power hits on the gaming machine i.e. the game event is a "critical game event."

As previously described in regards to the gaming machine's transaction based software system, critical data modifications defined in a critical game event may be added to a list of critical game transactions defining a state in the gaming machine by the event manager 230 where the list of critical game transactions may be sent to the NV-RAM via the NV-RAM manager 229. For example, the operations of reading the information from a card inserted into the gaming machine and data read from a card may generate a number of critical data transactions. When the magnetic striped card in the card reader 298 is a debit card and credits are being added to the gaming machine via the card, a few of the critical transactions may include 1) querying the non-volatile memory for the current credit available on the gaming machine, 2) reading the credit information from the debit card, 3) adding an amount of credits to the gaming machine, 4) writing to the debit card via the card reader 245 and the device drivers 259 to deduct the amount added to gaming machine from the debit card and 5) copying the new credit information to the non-volatile memory.

The operations, described above, that are performed in transferring credits from the debit card to the gaming machine may be stored temporarily in the physical non-volatile memory storage device 355 as part of a list of critical data transactions executed in one or more states. The critical data regarding the funds transferred to the gaming machine may be stored permanently in the non-volatile memory space as gaming machine accounting information. After the list of critical data transactions are executed in a current state, the list is cleared from the temporary non-volatile memory space allocated by the NV-RAM manager 229 and the non-volatile memory space may be utilized for other purposes.

In general, a game event may be received by the device interfaces 255 by polling or direct communication. The solid black arrows indicate event message paths between the various software units. Using polling, the device interfaces 255 regularly send messages to the physical devices 292 via the device drivers 259 requesting whether an event has occurred or not. Typically, the device drivers 259 do not perform any high level event handling. For example, using polling, the card reader 245 device interface may regularly send a message to the card reader physical device 298 asking whether a card has been inserted into the card reader. Using direct communication, an interrupt or signal indicating a game event has occurred is sent to the device interfaces 255 via the device drivers 259 when a game event has occurred. For example, when a card is inserted into the card reader, the card reader 298 may send a "card-in message" to the device interface for the card reader 245 indicating a card has been inserted which may be posted to the event manager 230. The card-in message is a game event. Other examples of game events which may be received from one of the physical devices 292 by a device interface, include 1) Main door/Drop door/Cash door openings and closings, 2) Bill insert message with the denomination of the bill, 3) Hopper tilt, 4) Bill jam, 5) Reel tilt, 6) Coin in and Coin out tilts, 7) Power loss, 8) Card insert, 9) Card removal, 10) Promotional card insert, 11) Promotional card removal, 12) Jackpot and 13) Abandoned card.

Typically, the game event is an encapsulated information packet of some type posted by the device interface. The game event has a "source" and one or more "destinations." As an example, the source of the card-in game event may be the card reader 298. The destinations for the card-in game event may be the virtual player tracking unit 224 and the communication manager 220. The communication manager may communicate information on read from the card to one or more devices located outside the gaming machine while the virtual player tracking unit 224 may prompt the card reader 298 via the card reader device interface 255 to perform additional operations. Each game event contains a standard header with additional information attached to the header. The additional information is typically used in some manner at the destination for the event.

As described above, game events are created when an input is detected by one of the device interfaces 255. The game events are distributed to their one or more destinations via a queued delivery system using the event distribution software process 225. However, since the game events may be distributed to more than one destinations, the game events differ from a device command or a device signal which is typically a point to point communication such as a function call within a program or interprocess communication between processes.

Since the source of the game event, which may be a device interface or a server outside of the gaming machine, is not usually directly connected to destination of the game event, the event manager 230 acts as an interface between the source and the one or more event destinations. After the source posts the event, the source returns back to performing its intended function. For example, the source may be a device interface polling a hardware device. The event manager 230 processes the game event posted by the source and places the game event in one or more queues for delivery. The event manager 230 may prioritize each event and place it in a different queue depending on the priority assigned to the event. For example, critical game events may be placed in a list with a number of critical game transactions stored in the NV-RAM as part of a state in the state-based transaction system executed on the gaming machine.

After a game event is received by the event manager 230, the game event is sent to event distribution 225 in the gaming system 215. Event distribution 225 broadcasts the game event to the destination software units that may operate on the game event. The operations on the game events may trigger one or more access requests to the NV-RAM via the NV-RAM manager 229. For instance, when a player enters a bill into the gaming machine using the bill validator 296, this event may arrive at the bank manager 222 after the event has passed through the device drivers 259, the bill validator device interface 245, the event manager 230, and the event distribution 225 where information regarding the game event such as the bill denomination may be sent to the NV-RAM manager 229 by the event manager 230. After receiving the game event, the bank manager 222 evaluates the game event and determines whether a response is required to the game event. For example, the bank manager 222 may decide to increment the amount of credits on the machine according to the bill denomination entered into the bill validator 296. Thus, one function of the bank manager software 222 and other software units is as a game event evaluator. More generally, in response to the game event, the bank manager 222 may 1) generate a new event and post it to the event manager 230, 2) send a command to the device interfaces 255, 3) send a command or information to the wide area progressive communication protocol 205 or the player tracking protocol 200 so that the information may be sent outside of the gaming machine, 4) do nothing or 5) perform combinations of 1), 2) and 3).

Non-volatile memory may be accessed via the NV-RAM manager 229 via commands sent to the gaming machine from devices located outside of the gaming machine. For instance, an accounting server or a wide area progressive server may poll the non-volatile memory to obtain information on the cash flow of a particular gaming machine. The cash flow polling may be carried out via continual queries to the non-volatile memory via game events sent to the event manager 230 and then to the NV-RAM manager 229. The polling may require translation of messages from the accounting server or the wide area progressive server using communication protocol translators 210 residing on the gaming machine.

The communication protocols typically translate information from one communication format to another communication format. For example, a gaming machine may utilize one communication format while a server providing accounting services may utilize a second communication format. The player tracking protocol translates the information from one communication format to another allowing information to be sent and received from the server. Two examples of communication protocols are wide area progressive 205 and player tracking protocol 200. The wide are progressive protocol 205 may be used to send information over a wide area progressive network and the player tracking protocol 200 may be used to send information over a casino area network. The server may provide a number of gaming services including accounting and player tracking services that require access to the non-volatile memory on the gaming machine.

The power hit detection software 228 monitors the gaming machine for power fluctuations. The power hit detection software 228 may be stored in a memory different from the memory storing the rest of the software in the gaming system 215 or it may stored in the same memory. When the power hit detection software 228 detects that a power failure of some type may be eminent, an event may be sent to the event manger 230 indicating a power failure has occurred. This event is posted to the event distribution software 225 which broadcasts the message to all of the software units and devices within the gaming machine that may be affected by a power failure. As described with reference to FIGS. 5, 7 and 8 power hit detection is used by the NV-RAM controller to determine whether data may be read or written from the NV-RAM 525.

Device interfaces 255 are utilized in the gaming system software 215 so that changes in the device driver software do not affect the gaming system software 215 or even the device interface software 255. For example, the player tracking events and commands that each physical device 292 sends and receives may be standardized so that all the physical devices 292 send and receive the same commands and the same player tracking events. Thus, when a physical device is replaced 292, a new device driver 259 may be required to communicate with the physical device. However, device interfaces 255 and gaming machine system software 215 remain unchanged. When the new physical device requires a different amount of NV-RAM from the old physical device, an advantage of the NV-RAM manager 229 is that the new space may be easily allocated in the non-volatile memory without reinitializing the NV-RAM. Thus, the physical devices 292 utilized for player tracking services may be easily exchanged or upgraded with minimal software modifications.

The advantage afforded by the NV-RAM manager 229 may be extendable to software upgrades or software additions of any software units in the gaming machine software 201 utilizing the physical non-volatile memory. For instance, new game software may be loaded onto to the gaming machine such as exchanging video poker game software for video slot game software. In many cases, the new game will have different non-volatile memory requirements than the old game. Using the NV-RAM manager described above, the physical NV-RAM may be easily reconfigured to accommodate the new game without reinitializing the physical NV-RAM which was required in the past. An example of the software maintenance process on a gaming machine including loading and unloading software is described with reference to FIG. 11.

The various software elements described herein (e.g., the device drivers, device interfaces, communication protocols, etc.) may be implemented as software objects or other executable blocks of code or script. In a preferred embodiment, the elements are implemented as C++ objects. The event manager, event distribution, software player tracking unit and other gaming system 215 software may also by implemented as C++ objects. Each are compiled as individual processes and communicate via events and/or interprocess communication (IPC).

Figure 3:
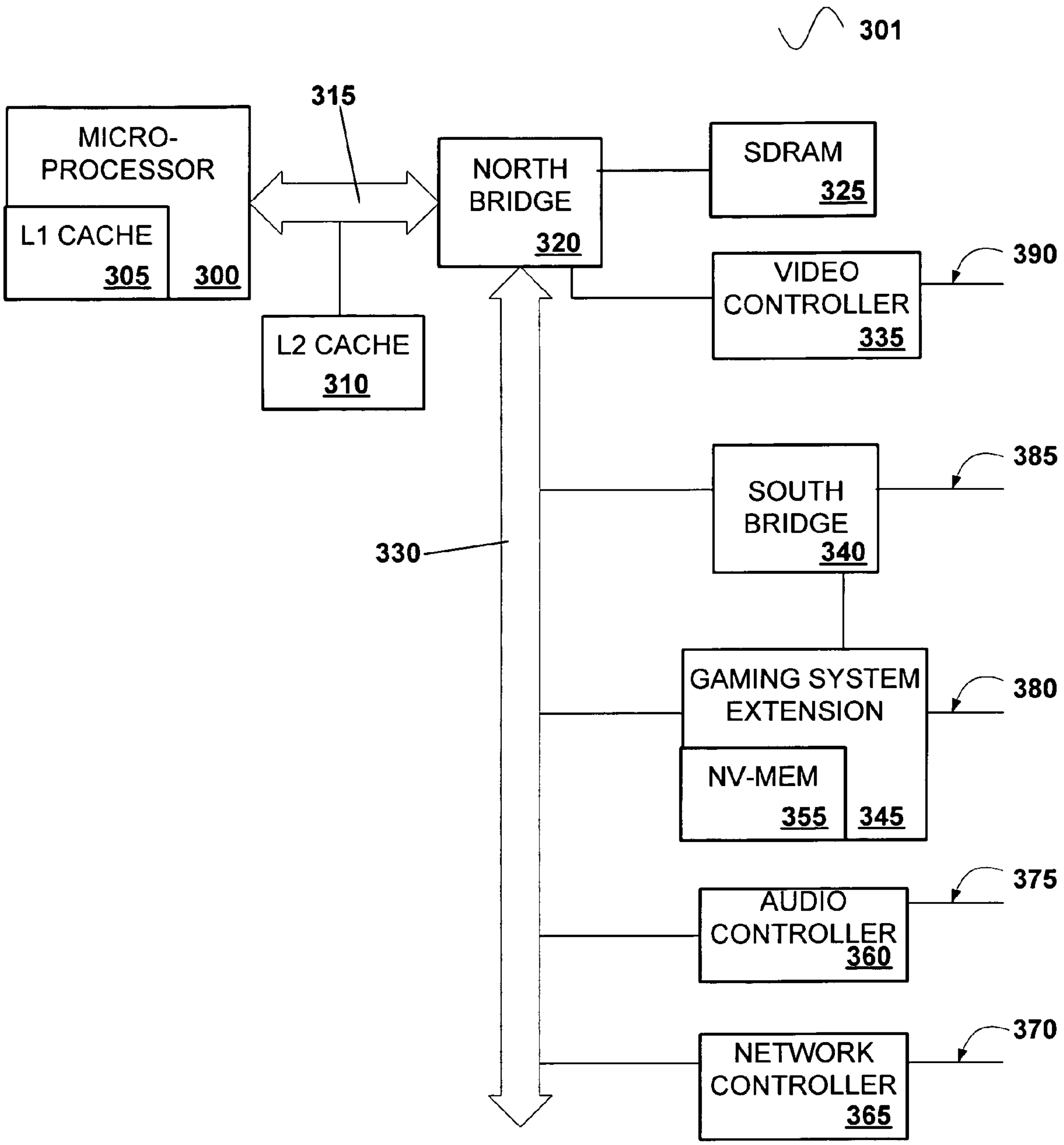
FIG. 3 is a block diagram of a main processor board of a gaming machine with a non-volatile memory storage device in one embodiment of the present invention.

FIG. 3 is a block diagram of the main processor board 301 of a gaming machine with a non-volatile memory storage device in one embodiment of the present invention. The main processor board 301 may be standard board in a modern personal computer. The microprocessor 300 executes the logic provided by the gaming software on the gaming machine. The microprocessor may be a Pentium series processor available from Intel corporation, Santa Clara, Calif. or a K6 series processor available from AMD corporation, Sunnyvale, Calif.

To increase the performance of the microprocessor, data and instructions may be stored in the L1 cache 305 on the microprocessor 300 or the L2 cache 310 located off of the microprocessor bus 315. For gaming machine applications with critical data storage requirements, the L1 cache and L2 cache are not usually utilized for critical data storage because data stored in the these locations may be lost in the event of a power failure. Thus, a separate non-volatile memory storage device 355 is utilized.

The north bridge 320 converts signals between the microprocessor bus signals, Peripheral Component Interface (PCI) bus signals, memory bus signals and advanced graphic port (AGP) signals (i.e. microprocessor to PCI, microprocessor to AGP, microprocessor to memory, PCI to microprocessor, PCI to AGP, AGP to PCI, etc.) The signals for the microprocessor bus, PCI bus, memory bus and advanced graphic port may differ according to the voltage level, clock rate and bit width. Also, the format of appropriate control signals on each type conduit such as read strobe, write strobe, ready signal for timing, address signals and data signals may vary from conduit to conduit. The north bridge enables communications between the different types of conduits. For instance, PCI is a well defined standard used in the personal computer industry. PCI is maintained by the Peripheral Component Interface Special Interest Group (PCISIG), Portland, Oreg., http://www.pcisig.com). PCI version 2.1 typically uses a 33 MHZ clock rate, a 32 bit wide data signal at 5 V to send signals. Versions of PCI using a 64 bit wide data signal are also available. In contrast, the clock rate used to send data signals on the microprocessor bus 315 or to the video controller 335 may be much higher.

The Synchronous Dynamic Random Access Memory (SDRAM) may store the gaming machine software 201 (see FIG. 2) executed by the microprocessor 300. The gaming machine software 201 allows a game to be played on the gaming machine. The video controller 335 may be used to send signals to one or more displays (see FIG. 1) connected to the gaming machine via connection 390 such that a game outcome presentation may be presented to a player playing a game on the gaming machine. The video controller 335 may installed as part of a video card that includes video memory and a separate video processor. Using the microprocessor 300 and the video controller 335, high-quality 3-D graphics and multimedia presentations may be presented as part of a game outcome presentation. To preserve a game history on the gaming machine, critical history information from the game outcome presentation including one or more frames from a sequence of frames used in the game outcome presentation may be stored in the Non-volatile memory 355. The frames may be copied to the non-volatile memory 355 from frame buffers residing on the video controller or at another location in the gaming machine.

Keyboards, printers, audio components and network components are devices that may typically communicate with the microprocessor 300 via the PCI bus 330. For instance, an audio controller 360, which may send signals to one or more sound projection devices via a connection 375, is connected to the PCI bus. The network controller, which may communicate with one or more networks including a casino area network (local area network) or a wide area progressive network (wide area network) via the connection 370, is connected to the PCI bus 330. The network controller 365 may allow the gaming machine to communicate with devices that provide gaming services such as an accounting server and a wide area progressive server. The accounting server may poll the gaming machine for accounting information stored in the non-volatile memory storage device 355. The wide area progressive server may receive information stored in the non-volatile memory storage device 355 such as wagers made on the gaming machine and may send information to be stored in the non-volatile memory storage device such as the value of a progressive jackpot. The communication with the non-volatile memory storage device 355 may be implemented via the software architecture described with reference to FIG. 2.

The south bridge 340, which is also connected to the PCI bus 330, may be connected to one or more serial ports via connection 385. The serial ports may used to communicate with various devices including a bill validator. For example, when a bill or an award ticket is accepted by the bill validator, information regarding the denomination of the bill or the value of the award ticket may be transferred serially using an IGT Netplex interface to the south bridge 340 where the Netplex serial signals are converted to PCI standard signals by the south bridge 340 using a Netplex device driver 260. Netplex is an IGT proprietary protocol (IGT, Reno, Nev.). Other non-proprietary methods of communication such as serial (e.g. RS-232) may also be used. The information transferred from the bill validator may be treated as critical game information by the software architecture using non-volatile memory storage (e.g. NV-RAM) as described with reference to FIG. 2.

The non-volatile memory storage device 355 is connected to the PCI bus as part of a gaming system extension 345. The gaming system extension includes one or more serial connections 380 that allow communication with devices such as player tracking units, wide are progressive systems and casino area networks. The gaming system extension 345 is described in detail with respect to FIG. 4.

The non-volatile memory storage device 355 is connected to the PCI bus for a number of reasons. First, the PCI bus allows for a relatively fast connection (e.g. 33 MHz clock rate and 32 bit data width) between the microprocessor 300 and the non-volatile memory storage device 355. The fast connection is important because in a state based transaction system the software does not advance to the next state until the current state is executed or rolled back. The execution of each state involves a number of access requests to the non-volatile memory storage device 355. When the access rate to the non-volatile memory contained within the non-volatile memory storage device is slow, the performance of the entire gaming system may be degraded.

A second reason the PCI bus is utilized is because there is not any data caching on the PCI bus. This property is important for preserving critical data in the event of power failures and execution of states in the state-based transaction system. The PCI bus allows for non-cached transfers of data between the SDRAM 325 and the non-volatile memory storage device 355. Once a transfer of critical data has been initiated between these devices, the data transfer may be successfully completed or the data transfer may not completed (e.g. as a result of a power failure or some other malfunction). Thus, the gaming system software may always determine the status of the data transfer. When caching is employed, the data may reside in an invalid state where it is not possible to determine the status of the data transfer while it resides in the cache waiting to be sent. While the critical data is in an invalid state, the gaming system software is unable to advance to the next state in a state-based transaction system which may degrade the performance of the gaming system.

A third reason the PCI bus is employed is because battery backed RAM, including SRAM, tends to have a much lower access speed as compared to the SDRAM 325 or DRAM used on most personal computers. The low access speed of the SRAM is a result of the low power consumption characteristics of these devices. However, the slow access speed of the SRAM may makes it incompatible with high speed memory controllers available on most personal computers which is designed to communicate with DRAM or SDRAM memory chips which have a much higher access speed than the SRAM. Although DRAM and SDRAM chips tend to have faster access times and cost less as compared to SRAM chips, their power consumption is too great as to be compatible with the 5-7 year storage lifetime of critical data designed into the non-volatile memory storage device 355.

The PCI bus is one example of a device interface bus that may be available on a gaming machine. The advanced graphic bus and the ISA bus are other examples of device interface busses that may be available. An embodiment of the invention utilizing a PCI bus has been described for the purposes of clarity. However, the invention described herein is not limited to a particular type of device interface bus and may be adapted to different device interface busses as needed.

Advantages of allowing the non-volatile memory storage device to interface to a PCI bus or a similar device interface are hardware upgrades, platform independence and an open game development environment. As previously mentioned, a large non-volatile memory is a critical element on a gaming machine but is not usually a standard component on the main processor board of a personal computer. By allowing the non-volatile memory storage device to interface as a peripheral on a standard PC main processor board, the non-volatile memory storage device is easily adaptable to new processor boards as their capabilities evolve. In addition, the non-volatile memory may be employed with a variety of processor boards employing the PCI bus standard. Thus, the non-volatile memory storage device may be portable to a variety of computing platforms supporting the PCI bus standard. The portability of the non-volatile memory storage device may allow game development on a variety of computing platforms. For instance, with a portable non-volatile memory storage device and the gaming system extension, game development may be carried out a personal computers or work stations that emulate the functions of the gaming machine allowing more flexibility in the design of games for gaming machines. At the same time, security of the gaming machine hardware may be preserved because security features built into an actual gaming machine may not be visible to a game designer employing a gaming machine emulator to design a game. A more complete discussion of a gaming machine emulator is provided in commonly assigned, copending U.S. patent application Ser. No. 09/687,516, entitled "GAMING HARDWARE SIMULATOR" filed Oct. 13, 2000, the entire specification of which is incorporated herein by reference.

Figure 4:
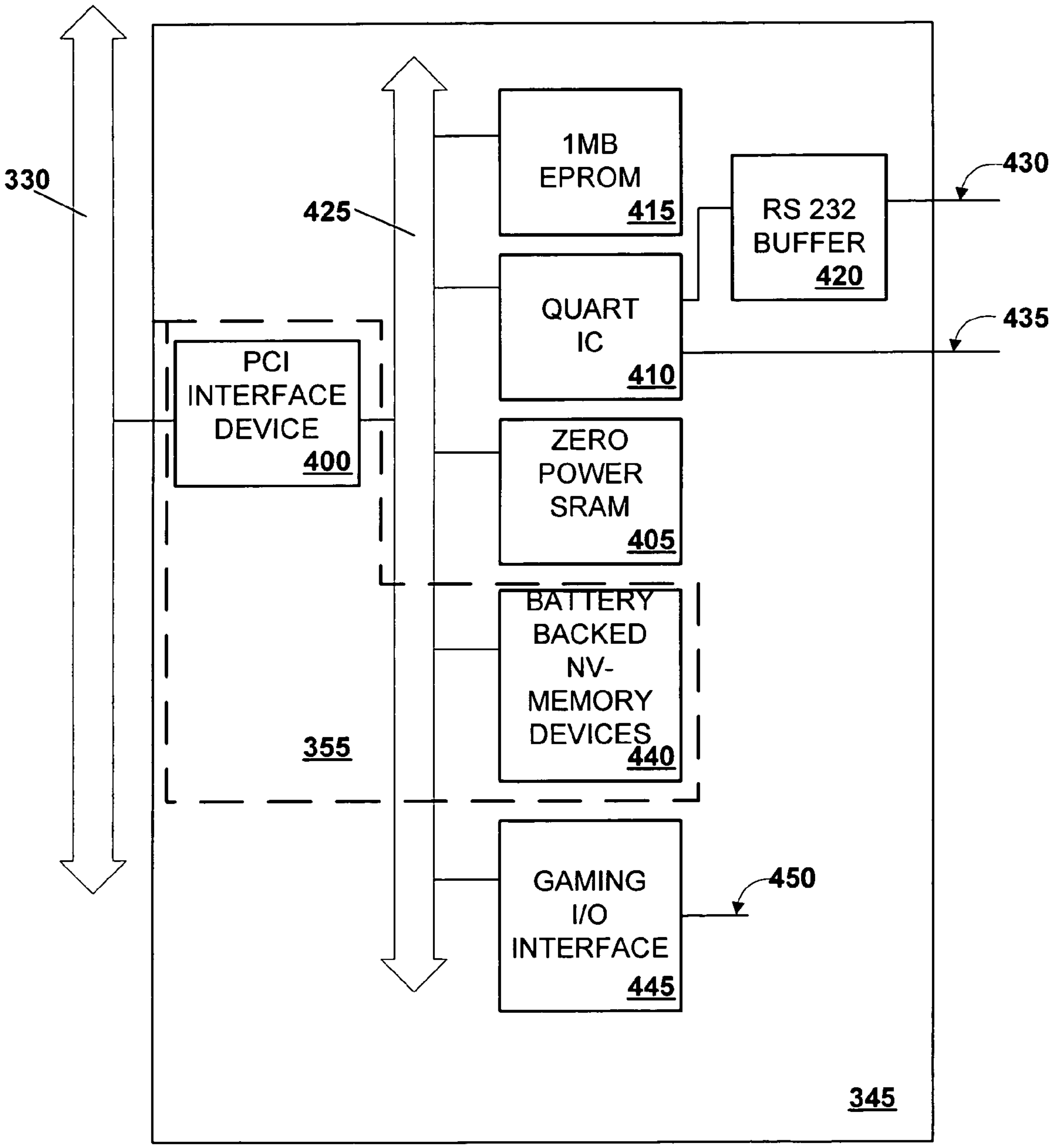
FIG. 4 is a block diagram of a gaming system extension 345 with a non-volatile memory storage device 355 for one embodiment of the present invention.

FIG. 4 is a block diagram of a gaming system extension 345 with a non-volatile memory storage device 355 for one embodiment of the present invention. The gaming system extension includes a PCI interface device 400 that converts between PCI signals and the signals necessary to communicate with the devices connected to the PCI interface device 400 including an EPROM 415, a 4 channel interface device (QUART IC) 410, a zero power SRAM 405 and battery backed NV-memory devices 440. An example of a PCI interface device is the PLX 9050 provided by PLX Technology of Sunnyvale, Calif. The PLX 9050 provides a PCI to generic bus conversion and can be configured to support 8, 16 and 32 bit bus widths for up to 5 memory regions the device can decode. For the non-volatile memory storage device 355, the PCI interface device is used to convert PCI signals to the signals used by the SRAM (static random access memory) chips. The SRAM is one of the battery backed NV-memory devices 440 described in more detail with reference to FIG. 5. The SRAM chips are designed for low power consumption and have electrical signaling requirements that are typically incompatible with the voltage levels and signaling requirements of the PCI standard bus.

To conserve resources and reduce component count, several memory and I/O subsystems unique to the gaming industry, including the EPROM 415, the QUART 410 and the zero power SRAM 405 were grouped behind the PCI interface device 400 and share its the capabilities with the non-volatile memory storage device 355. In general, the EPROM 415, the QUART 410 and the zero power SRAM 405 are not needed to provided non-volatile memory capabilities. As described in FIG. 5, the non-volatile memory storage device may be designed without these devices. In the gaming system extension embodiment 345 which includes the non-volatile memory storage device 355, the 1 MB EPROM 415 is used to store secure IGT developed start code and verification routines, along with critical operating routines, such as the random number generator, which requires a high standard of validity.

The zero power SRAM 405 is SRAM that contains a built-in battery. The zero power SRAM of this type is a requirement in some gaming jurisdictions. The SRAM utilized in the battery backed non-volatile memory storage device 355 contains a battery separate from the SRAM. The zero power SRAM 405 may be used to extend the memory space provided by the NVRAM management software.

The QUART integrated circuit 410 provides serial connections to the main processor board 301. For instance, the serial ports of the QUART 410 may be connected to a configurable main communication board via a connection 430 where the main communication board uses plug-in cards to translate RS232 signals from the serial ports on the QUART IC 410 to those needed for communication with devices such as a player tracking unit, a wide area progressive system and a casino area network. The RS232 buffer 420 translates serial interface signals provided by the QUART 410 to EIA RS232 levels. The QUART IC 410 signals are translated to RS232 for communication with the main communication board. As described above, the player tracking unit, the wide area progressive system as well as other devices connected to the gaming machine via the casino area network may send access requests to the gaming machine requesting information stored in the non-volatile memory storage device 355.

Using connection 450, the gaming I/O interface 445 may be used for communication with the door security circuitry as well as the IGT proprietary SENET serial I/O interface. For instance, the SENET serial I/O interface may be used to obtain information from a coin acceptor. The path of a coin through the coin acceptor and optical detection circuitry may be reflected in input bits received via the SENET interface. The gaming system software monitors the path of the coin, ensuring that certain timing characteristics are met. Based on the timing characteristics, the gaming machine software determines the coin has been dropped into the gaming machine and a valid coin has entered the machine correctly (e.g. a string is not connected to the coin). When the gaming system software detects the coin entered the machine correctly, it registers a "coin in" game event using the software architecture, as described with reference to FIG. 2, and the NV-RAM manager 229 may receive access requests to update appropriate values critical data in the non-volatile memory storage device 355 such as the credits available on the gaming machine.

The battery backed NV-memory devices connected to the PCI interface device 400 via the local bus 425 send data and receive data at a 12 MHz clock rate with a 32 bit data width. The clock rate is dictated by timing requirements of the other devices in the gaming machine. In other embodiments of the non-volatile storage device 355, these other devices may not be added to the PCI interface device 400 as part of the gaming machine extension 345 and a higher clock rate may be employed. Details of the Battery back non-volatile memory storage devices 440 are described with reference to FIG. 5.

Figure 5:
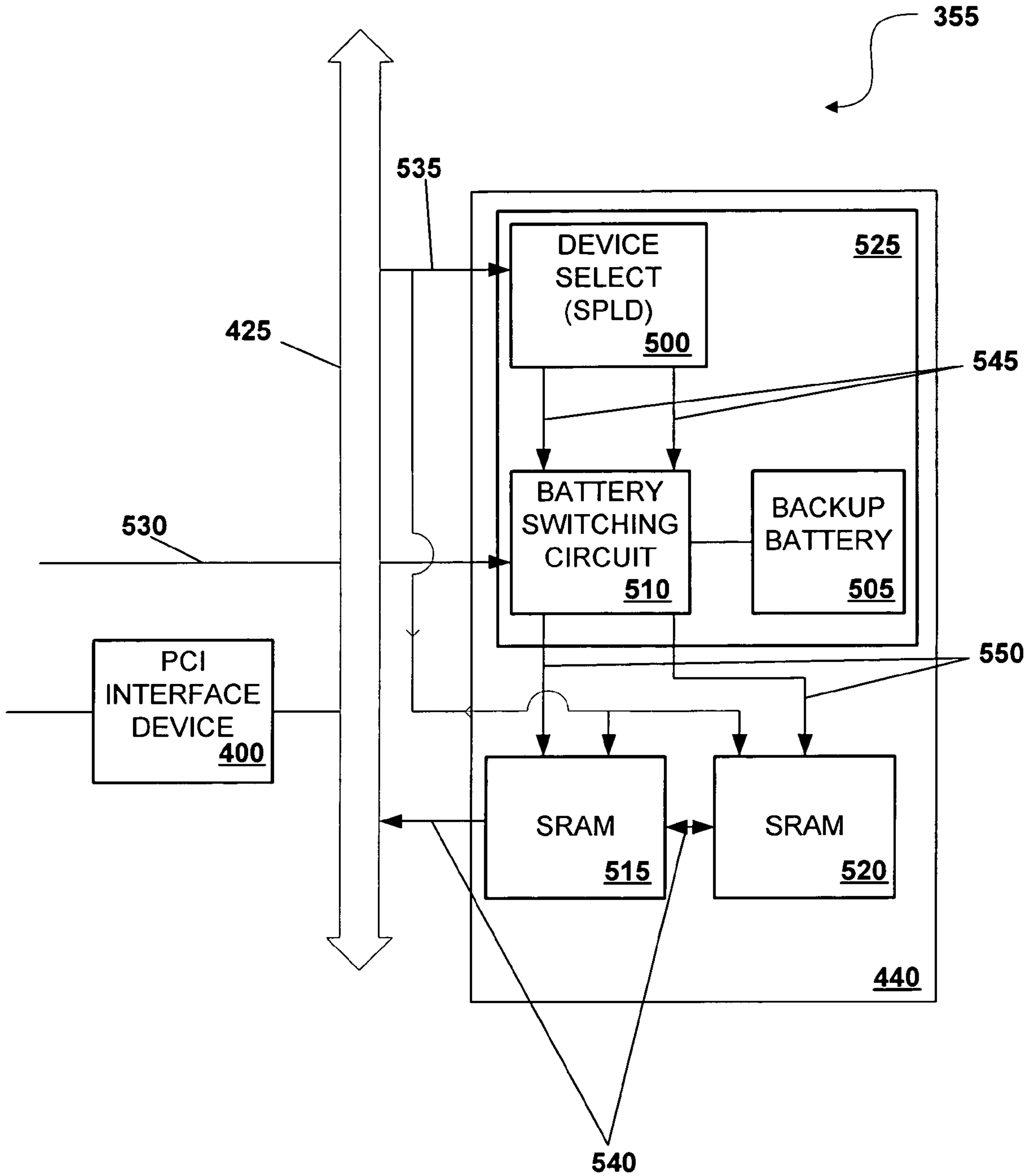
FIG. 5 is a block diagram of a non-volatile memory storage device 355 connected to a PCI bus in one embodiment of the present invention.

FIG. 5 is a block diagram of a non-volatile memory storage device 355 connected to a PCI bus in one embodiment of the present invention. The memory configuration may consist of 8 512 KB static RAM (SRAM) devices that store 4 MB of data. Thus, the SRAM 515 and SRAM 520 may each comprise four non-volatile memory chips. The non-volatile memory storage device 355 is not limited to this memory configuration. For instance, the memory configuration in the device may use more chips, less chips, chips containing more or less memory, different types of chips such as flash memory or combinations of different types of chips such as flash memory and SRAM. For instance, in one embodiment, one chip containing 1 megabyte of data may be used.

The PCI interface device 400 receives addresses from the microprocessor via the PCI bus based upon a memory map, e.g. an abstraction of the physical memory of the non-volatile memory constructed by the operating system. The addresses may be memory locations for a read from non-volatile memory or a write to the non-volatile memory including 515 and 520. The format conversion may involve changing a clock rate, voltage level and data bit width associated with the data signal as well as control signal formats such as read strobe and write strobe. The data bit width for may be between 8 and 64 bits. After the receiving the addresses, the PCI interface device 400 decodes the addresses to a form readable by the physical hardware and converts the signals to a format acceptable to the NV-RAM controller 545 and the SRAM chips including 515 and 520. The NV-RAM controller 545 monitors the power level to the gaming machine via connection 530 and the backup battery 505. In the event of a significant power fluctuations, a write of data to the non-volatile memory or read of data from the non-volatile memory may be prevented.

Address signals from the PCI interface device may be received by the device select logic 500 within the NV-RAM controller 525 and the SRAM chips including 515 and 520 via a connection 535 to the local generic bus 425. For instance, the most significant bits of the address signal may be received by the device select logic 500 while the least significant bits of the address signal may be received by the SRAM chips. The device select logic 500 further decodes the address signals to determine an actual chip location for the data. For example, when the SRAM is composed of 8 memory chips, the device select logic may determine that the address contained in the address signal is located on either chips 0-3 or chips 4-7.

After the chip selects are determined by the device select logic corresponding to the address received by the PCI interface device, the chip selects are passed to the battery switching circuit 510 via the connections 545. The device select logic and the battery switching circuit 510 may be connected by two connections 545 such that the chip selects for chips 0-3 are sent via one of the connections and the chip selects for chips 4-7 are sent via another one of the connections. The battery switching circuit 510 contains a cut-off switch which may be activated by the fluctuations in a voltage read by the circuit. The voltage may correspond to a system power supply voltage provided by the gaming machine to the main processor board.

Under normal conditions (i.e. the cut-off switch remains inactive), the SRAM receives the chip select signals and data may be sent by the SRAM's (e.g. read) or data may be received by the SRAM's (e.g. write) via the connections 540 between the SRAM chips and the local bus 425. For reads, the PCI interface device 400 converts the data signals to voltage levels consistent with the PCI bus. Once the critical data from the Non-volatile memory storage device 355 is on the PCI bus, the data may be sent to the SDRAM, microprocessor register or other memory locations on the main processor board.

When the cut-off switch is activated, chip select signals are prevented from reaching the SRAM which prevents reads or writes to the chips. In one embodiment, the SRAM cut-off occurs when the system 5-volt power supply voltage level falls below about 4.37 V. However, the power supply cut-off voltage level may vary between about 4.25 V and 4.5 V. A drop in the power supply voltage level may indicate an impending power failure within the gaming machine. Thus, a power supply source for the non-volatile memory may be switched from the system power supply to the battery 505 by the battery switching circuit 510. The battery switching circuit 510 receives power from a back-up battery 505 so that fluctuations in the system 5-volt power supply may not affect the functions of the battery switching circuit 510.

The battery switching circuit 510 also monitors the backup battery 505 voltage level to notify the gaming machine when the backup battery 505 may be near failure. When the battery power fails data stored in the non-volatile memory including SRAM chips 515 and 520 may be lost. In one embodiment, the backup battery is a lithium battery cell. A lithium battery cell is employed because lithium batteries usually have a relatively large energy density. A large energy density is important for the 5 year storage requirement which the non-volatile memory storage device 355 may be designed to maintain.

In one embodiment, the battery switching circuit 510 may be a DS1321 Flexible Nonvolatile controller with Lithium Battery Monitor provided by Dallas Semiconductor of Dallas, Tex. The invention is not limited to this device and the functions afforded by the DS1321 may be provided by other integrated circuits utilizing a different designs than the DS1321. The controller monitors incoming power for an out of tolerance condition. When an out of tolerance conditions is detected, the chip select outputs are inhibited to accomplish write protection and the backup battery 505 is switched on to supply the SRAM's including 515 and 520 with uninterrupted power. The chip utilizes circuitry that affords precise voltage detection at extremely low battery consumption. One DS1321 can support as many as four SRAM's arranged in any of three memory configurations.

The DS1321 performs the function of monitoring the remaining capacity of the lithium battery 505 and providing a warning before the battery reaches end-of-life. Because the open-circuit voltage of a lithium backup battery 505 remains relatively constant over the majority of its life, accurate battery monitoring requires loaded-battery voltage measurement. The battery voltage measurement function is performed in the DS1321 by periodically comparing the voltage of the battery as it supports an internal resistive load with a selected reference voltage. When the battery voltage falls below the reference voltage, a battery warning pin is activated to signal the need for battery replacement which may be sent to main processor board via the local bus 425 and the PCI interface device 400.

Figure 6:
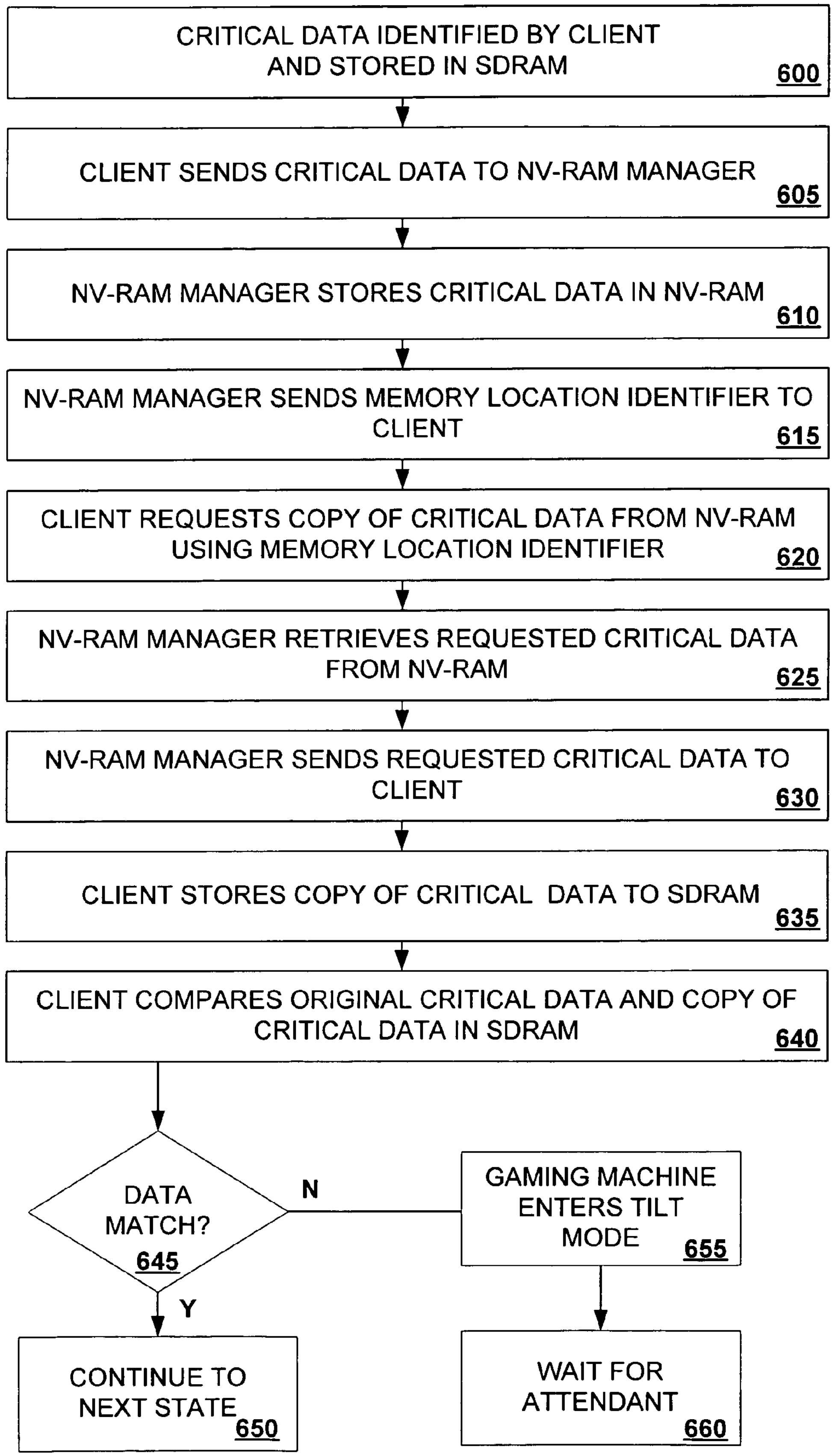
FIG. 6 is a flow chart of a method of storing critical data to the non-volatile memory for one embodiment of the present invention.

FIG. 6 is a flow chart of a method of storing critical data to the non-volatile memory for one embodiment of the present invention. The flow chart describes some of the operations performed by the gaming system software. In 600, critical data is identified by a client and stored in SDRAM (e.g. the main memory located on the processor board). As described above with reference to FIG. 2, the event manager is one example of a client that may identify critical data to be stored in the non-volatile memory. In general, a client is any software unit requesting access to the non-volatile memory. The critical data may be identified according to predetermined criteria of the gaming machine manufacturer, gaming machine operators and gaming regulators. The predetermined criteria are stored as logic executed by the gaming machine. Critical data may include gaming parameters (e.g. the value of bill accepted by the gaming machine), instructions requesting the modification of data stored in the NV-RAM, game history information and a list of operations executed as part of a state on the gaming machine.

In 605, the client sends the critical data identified in 600 with an access request to the NV-RAM manager (see FIG. 2). The access request may include a number of instructions and parameters as part of protocol recognized by the NV-RAM manager. For instance, the protocol may include instructions and parameters such as: 1) a requested memory size, 2) write data, 3) read data, 4) a data signature and 5) a handle identifying particular memory locations. These protocols are part of a non-volatile memory allocation system implemented with the NV-RAM manager. Details of the non-volatile memory allocation system are described with reference to FIG. 9. In 610, based upon the instructions and parameters sent to the NV-RAM manager and after error checking automatically performed by the NV-RAM manager, the critical data is sent to the physical NV-RAM via the hardware described with reference to FIGS. 3, 4 and 5. A consistency check between the size of the data sent in the access request and the requested memory size may be an example of error checking implemented by the NV-RAM manager. Interaction diagrams describing the hardware and data interactions involving a read and write to the NV-RAM are described with reference to FIGS. 7 and 8.

In 615, the NV-RAM manager sends a memory location identifier to the client. The memory location identifier may be a name or a number used by the client to gain subsequent access to the data stored in NV-RAM. The memory location identifier may also be referred to as a "handle" which is a common term in the art. Details of the memory location identifier are described with reference to FIG. 9. In some embodiments, the consistency of the data stored in NV-RAM may be checked by the client by copying back to the SDRAM the data sent to the NV-RAM and comparing it with the original critical data identified in 600 and stored in the SDRAM.

In 620, the client requests a copy of the critical data from the NV-RAM using the memory location identifier assigned to the client in 615 by sending an access request to the NV-RAM manager. In 625, the non-volatile memory retrieves a copy of the requested critical data from the non-volatile memory. In 630, the NV-RAM manager sends the requested critical data to the client. In 635, the client stores the copy of the critical data to SDRAM. In 640, the client compares the original critical data and the copy of the original critical data stored in SDRAM. The comparison may be performed using a CRC, a checksum, a hash value or any other algorithm needed to check the validity of the original data and the copy of the original data from the non-volatile memory.

In 645, the client determines whether the original critical data sufficiently match. In 650, when the data matches, the gaming system software may continue to the next state. In 655, when the data does not match, the gaming machine enters tilt mode. Critical data may not match as a result of a malfunction in the physical NV-RAM and associated hardware, tampering with the gaming machine and software bugs. Thus, in 660, the tilt mode may be cleared by an attendant with a special key or some other technician with special means of accessing the gaming machine. In some cases, a tilt mode may result in the reinitialization of the NV-RAM or replacement of the NV-RAM hardware.

Figure 7:
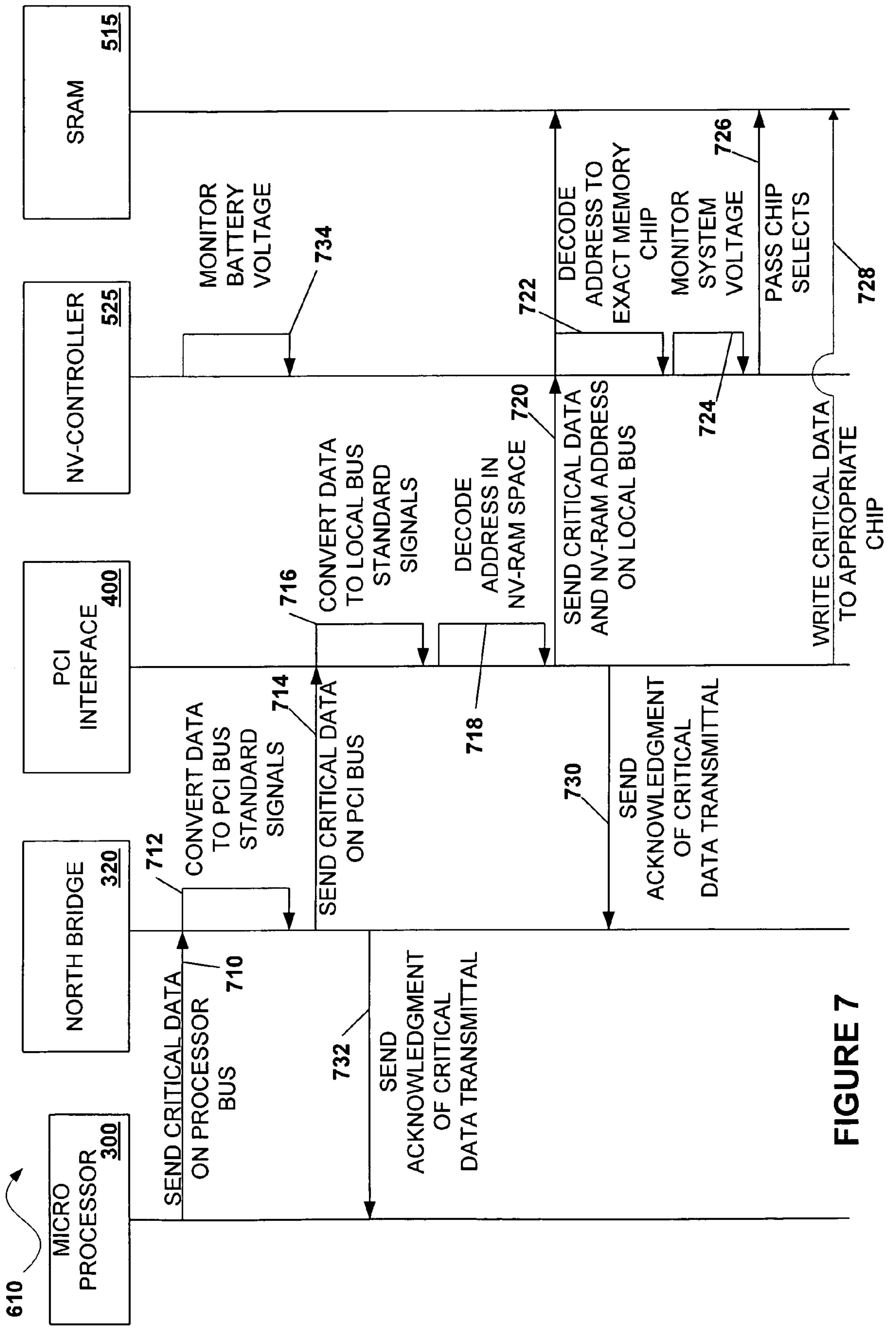
FIG. 7 is an interaction diagram between components on the main processor board and the non-volatile memory storage device during a write to the non-volatile memory storage device.

FIG. 7 is an interaction diagram between components on the main processor board and the non-volatile memory storage device during a write to the non-volatile memory storage device for one embodiment of the present invention. The interaction diagram may represent operation 610 in FIG. 6 where the NV-RAM manager stores critical data to the NV- RAM. The data transfer time between the microprocessor and the SRAM is usually some number of nanoseconds. During a power failure, the main processor board may operate for a few milliseconds before the power level drops to a level where components on the main processor board may begin to malfunction. Thus, once a power failure is detected, storage operations such as a write to the non-volatile memory may be completed before the components on the main processor board begin to malfunction. However, the hardware components, including the microprocessor 300, the North Bridge 320, the PCI interface device 400, the NV-RAM controller 524 and the SRAM 515, are described with reference to FIGS. 3, 4 and 5.

In 710, the microprocessor 300 sends critical on the processor bus to the North Bridge 320. Critical data may include gaming parameters (e.g. the value of bill accepted by the gaming machine), instructions requesting the modification of data stored in the NV-RAM, game history information, a list of instructions executed as part of a state on the gaming machine. The critical data may also include instructions needed to execute the operations associate with the critical data such as a requested memory size, addresses and other parameters. In 712, the North Bridge 320 converts the microprocessor signals to PCI bus standard signals. The conversion process may involve changing the voltage level of the signals, the clock rate, the bit width of the data and the format of control signals.

In 714, the critical data is sent on the PCI bus directly to the PCI interface device 400 without caching of any type. A typical data transfer time between the North Bridge 320 and the PCI interface device 400 is a few nanoseconds. In 732, a few nanoseconds after the North Bridge has sent the critical data to the PCI interface device 400, the North Bridge may send an acknowledgement to the microprocessor on the microprocessor bus indicating the critical data has been transmitted. The length of time between the transmittal of the critical data and the acknowledgement of the transmittal is a function of the clock rate of the North Bridge 320 which may vary.

In 716, the PCI interface device 400 converts the format of the data signals from the PCI bus to a format that is compatible with the NV-RAM controller 525 and the SRAM chips 515. In some embodiments, since more than one device may be connected to the PCI interface device 400, the data received from the PCI bus may contain information that allows the PCI interface device 400 to determine a destination device of the data. In 718, the PCI interface decodes the memory addresses sent with the critical data to addresses corresponding to physical locations in non-volatile memory. Typically, the gaming system software stores a map of the non-volatile memory space in a format that is converted to physical locations in the non-volatile memory. For instance, as described with reference to FIG. 9, the non-volatile memory space may appear as a file system in one abstraction of non-volatile memory space used by the gaming system software. The decoding of the addresses allows the storage of the critical data to specific memory locations on specific chips in the SRAM 515. In 730, a few nanoseconds after the PCI interface device 400 receives that critical data on the PCI bus from the North Bridge 320, the PCI interface device 400 sends an acknowledgement of the data transmittal to the North Bridge 730.

In 720, the PCI interface device 400 sends the non-volatile memory addresses for the write to the NV-RAM controller 525 and the SRAM 515 via the local bus between the PCI interface device. The clock rate for the data transfer may be as high 33 MHz using a 32 bit data width. In 722, the NV-RAM controller 525 further decodes the addresses such that the actual chips where the data may be written in the non-volatile memory are determined. In 724, the chip selects are received by a circuit in the NV-Controller 525 which monitors the system voltage. In 726, when the system voltage is within a prescribed range, the NV-controller passes the chip selects to the non-volatile memory which is SRAM 515 in this embodiment. In 728, the chip selects and the addresses passed to the SRAM in 722 allow critical data to be written from the PCI interface 400 to the appropriate chip in the SRAM 515.

When the voltage is not within a prescribed range the chip selects are not passed in 726 and subsequently critical data may not be written to the SRAM in 728. Also, the NV-controller switches the SRAM 515 to battery power. In 734, the NV-controller also monitors the battery voltage. When the battery voltage drops below a prescribed level, a warning message may be sent to the microprocessor 300. However, access requests to the non-volatile memory are unaffected by a low battery voltage.

Figure 8:
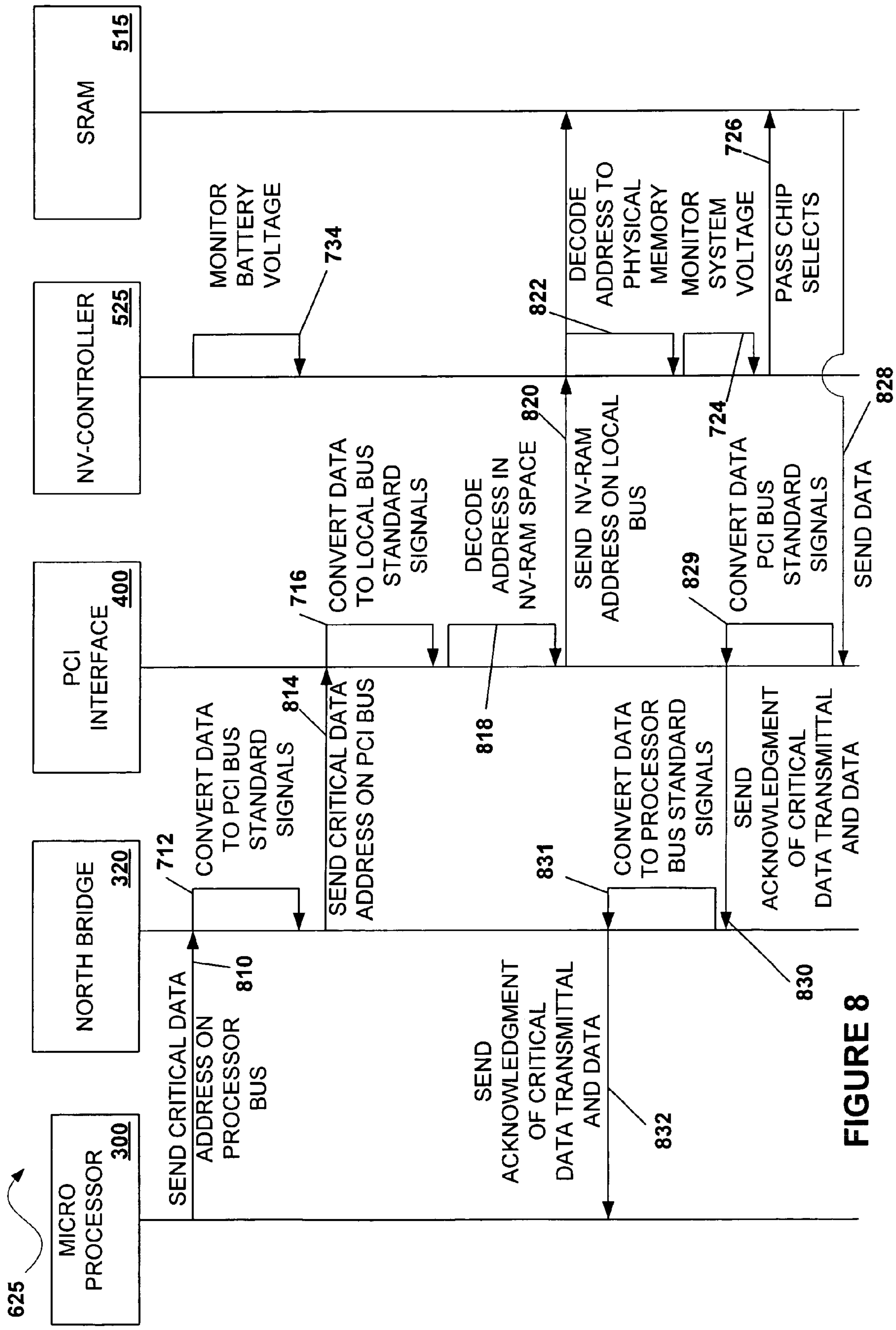
FIG. 8 is an interaction diagram between components on the main processor board and the non-volatile memory storage device during a read from the non-volatile memory storage device.

FIG. 8 is an interaction diagram between components on the main processor board and the non-volatile memory storage device during a read from the non-volatile memory storage device for one embodiment of the present invention. The interaction diagram may describe some of the hardware operations used when the software NV-RAM manager retrieves requested critical data from the non-volatile memory as described with reference to FIG. 6. In 810, critical data addresses corresponding to critical data stored in the NV-RAM from a map of the non-volatile memory maintained by the gaming system software may be sent by the microprocessor 300 to the North Bridge 320. In 712 and 814, the North Bridge converts the signals from the microprocessor to PCI compatible signals and sends them along the PCI bus to the PCI interface 400 which converts the PCI standard signals to a local bus signal format in 716. In 818, the PCI interface device decodes the addresses to a format compatible with the NV-controller and the SRAM 515 and send the addresses to these devices in 820.

In 822, the NV-RAM controller 525 further decodes the addresses to determine chip selects corresponding to the chips where the requested data is stored. In 724, the NV-RAM controller 525 monitors the system voltage level and in 726 when the voltage is within a prescribed level passes the chip selects to the SRAM 515. Using the chip selects and the addresses passed in 820, the SRAM 515 or other type of non-volatile memory sends the requested data to the PCI interface device 400 via the local bus in 828. In 829, the PCI interface device 400 converts signals containing the data from the non-volatile memory to the PCI Bus standard signal format. In 830, an acknowledgement of the critical data transmittal and the requested data are sent to the North Bridge 320 by the PCI interface device 400 using the PCI bus. In 831, the North Bridge 320 converts the PCI signals to a format compatible with the microprocessor bus. In 832, an acknowledgement of the critical data transmission and the requested data may be sent to the microprocessor 300 as well as the SDRAM for storage.

Figure 9:
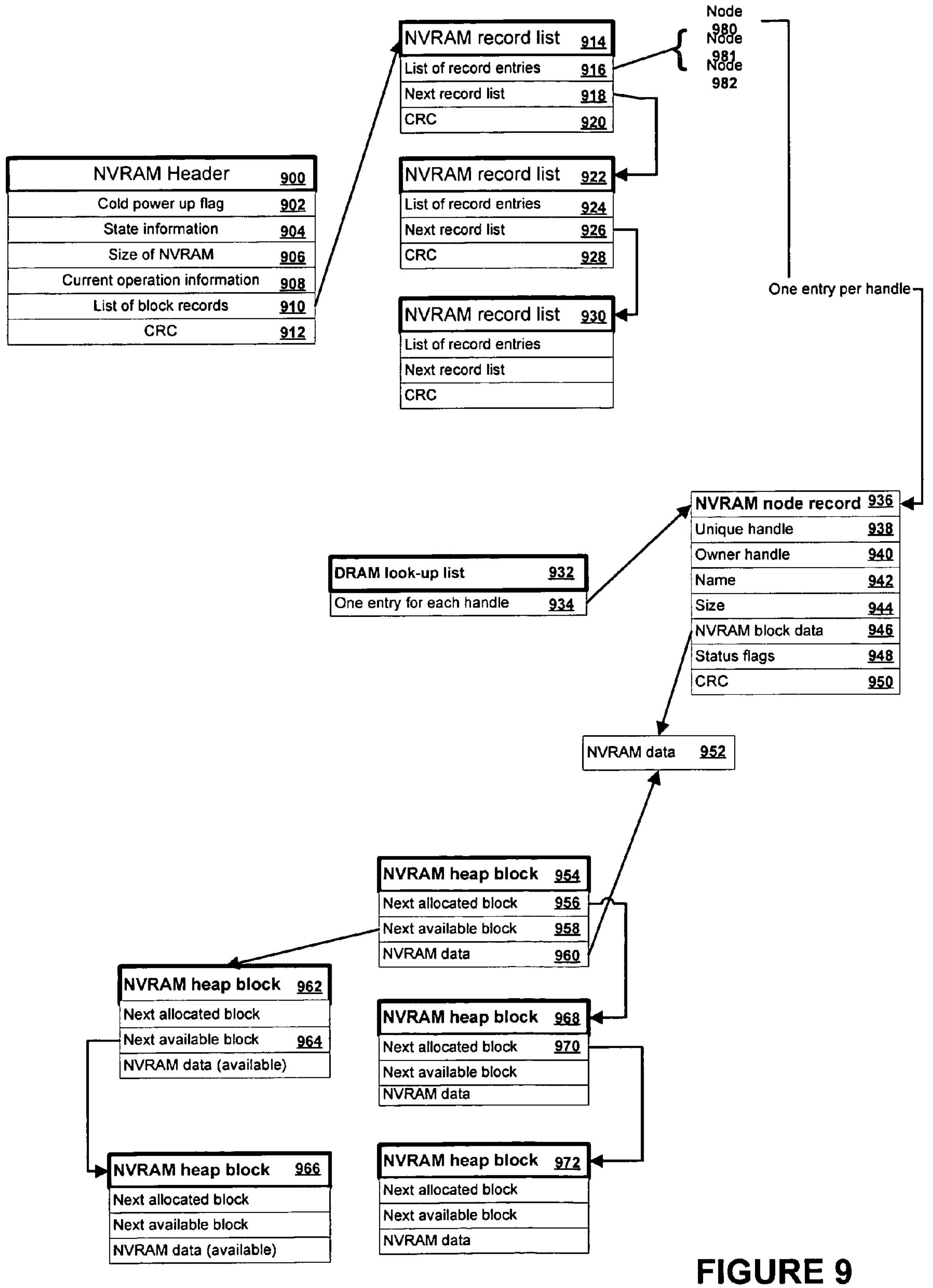
FIG. 9 is block diagram of a non-volatile memory allocation system implemented in the gaming system software for one embodiment of the present invention.

FIG. 9 is block diagram of a non-volatile memory allocation system implemented in the gaming system software for one embodiment of the present invention. The non-volatile memory allocation system 990, which includes the NV-RAM manager, allows the non-volatile memory to be dynamically allocated and de-allocated by the gaming system software which allows for more efficient use of the non-volatile memory. The NV-RAM header 900 is stored at the beginning of non-volatile memory. The header contains a cold power up flag 902. This flag 902 is set to a known value when the machine is first powered on and the non-volatile memory hasn't been initialized. When this flag 902 is set to the known value, the software knows that the contents of the non-volatile memory are in order and not in an un-initialized state. When the flag 902 is not set to the known value, the gaming machine software performs an initialization of the non-volatile memory which includes testing the integrity of the memory, clearing the memory, setting up internal data structure to manage the memory and finally setting the cold power up flag to the known value.

The NV-RAM header 900 contains information about the current state of the NV-RAM memory manager (SEE FIG. 2). This information may include several CRCs and current operation information 908 for operations that the NV-RAM manager can perform on a node. The current operation is an indication of a low level action being performed. For instance, the current operation information may include 1) a node record and 2) the operation to change a name of a node in the node record from "A" to "B". If the power goes out, the header may be inspected to determine what operation was being performed when the power went out and how to complete the operation. The power-up procedure is described in detail with reference to FIG. 13. The one or more CRCs and the details of the current operation information 908 are not shown in the diagram.

All information in the header 900 is only utilized when the CRCs, including 912, are correct. The CRC 912 is one or more signatures generated from data stored within the NV-RAM header 900 using a CRC algorithm or some other method such as a checksum or a hash value. An incorrect CRC may indicate data within the non-volatile memory has been corrupted in some manner. For instance, the data may be corrupted as the result of a hardware malfunction in the non-volatile storage device or as the result of tampering.

When the NV-RAM manager writes to the non-volatile memory the current operation information 908 may include the handle 938 being written to, the critical data to be written and a CRC of the critical data. A handle 938 is an identifier used by the client and by the NV-RAM manager to identify particular blocks of memory locations in the non-volatile memory. These memory locations may also be assigned "nodes" in the described embodiment by the non-volatile memory allocation system. The node designation allows the non-volatile memory allocation system to track blocks of memory.

Function requests that may be initialized by the client and performed by the NV-RAM manager may be listed in the operation information 908. Examples of function requests may include 1) create/allocate, 2) destroy/de-allocate, 3) open, 4) close, 5) read, 6) read/directory, 7) write, 8) resize, 9) move 10) get statistics and 11) change statistics. Only the primary function requests are listed. There are other function requests the NV-RAM manager may perform, but they are not listed. A brief description of the listed function requests are described below.

The create/allocate node function request allocates a node in the non-volatile memory. The NV-RAM manager returns a unique handle for the memory allocated. The destroy/de-allocate function request instructs the NV-RAM manager to remove the non-volatile memory node from non-volatile memory. The open function request is used to access an existing non-volatile memory node. The NV-RAM manager returns a unique handle for the memory requested. The close function request is sent to the NV-RAM manager when a client is no longer using the handle for a non-volatile memory node. The read function request requires the client to provide the handle for the non-volatile memory node of interest and a range of information to read from the non-volatile memory node. The read directory function request requires the client to specify which directory to read. The directory may be specified as a name or as a non-volatile memory handle. The NV-RAM manager may return a list of directories in response to the read directory function request. A non-volatile memory file system employing files and directories is described with reference to FIG. 12.

The write function request requires the client to provide the handle for the non-volatile memory and a range to be read by the NV-RAM manager. The NV-RAM manager returns the requested information to the client. The resize function request requires the client to provide the handle for the non-volatile memory and the new size of the non-volatile memory node. The move function request allows the client to move the node to another location in the non-volatile memory. For security purposes, the non-volatile memory locations of the various nodes may be occasionally shuffled. The get statistics function request is primarily a diagnostic function of the NV-RAM manager. The client makes this request to learn about the available non-volatile memory. The NV-RAM manager returns the information to the client. The change status function request is a utility function that allows the client to request that a particular non-volatile memory node be modified. This operation does not modify the contents of the non-volatile memory node, rather the permissions and other flags that indicate the owner and time stamps.

As part of the execution of a state, the NV-RAM manager may execute one or more of the function requests from one or more clients. The possible combinations of function requests may be quite large. For example, in the execution of a state the NV-RAM manager may 1) create/allocate nodes, 2) write to the created node, 3) write to a node previously created, 4) resize a previous node and 5) read from a previous node. In addition, each function request may include modifiers that further define the function request. The function request modifiers further expand the combinations of operations that may be performed. For example, with the create/allocate node function request, the client may specify that the node may not be resized. When the function request is executed, the function request modifier may be stored by the NV-RAM manager such that the node is not later resized. In a particular embodiment, the NV-RAM manager does not know about the state in general and the function of the NV-RAM manager is only to execute the various function requests from the clients. The Event Manager (see FIG. 2) determines the elements such as function requests comprising the state and sends the function requests to the NV-RAM manager for execution.

Returning to FIG. 9, the NV-RAM header 900 may contain a reference 910 to the first NV-RAM record list 914 of one or more NV-RAM record lists including 914, 922 and 930. The reference 910 is referred to as a "list of block records" in the NV-RAM header 900. The NV-RAM record lists, 914, 922 and 930 contain information about each non-volatile memory node in non-volatile memory. For example, NV-RAM record list 914 contains information about a number of non-volatile memory nodes including 980, 981 and 982. The NV-RAM record lists are allocated in fixed blocks for operation performance improvements although fixed blocks are not necessary to the implementation. Each non-volatile memory node is given an entry in a NV-RAM record list. For example, a non-volatile memory node 980 corresponding to the NV-RAM node record 936 is in list 916. Typically, the non-volatile memory allocation system 990 will contain many non-volatile memory nodes, including nodes 980, 981 and 982, contained in different NV-RAM record lists including 916 and 930 each with a corresponding NV-RAM node record although only one NV-RAM node record 936 corresponding to nodes 980 is shown in the diagram.

Once a particular NV-RAM record list becomes full, the NV-RAM memory manager creates another NV-RAM record list. The NV-RAM record lists, including 914, 922 and 930, are chained together such that each NV-RAM record list points to the next list until the final list which contains a value indicating that it is the last NV-RAM record list. For instance, next record list 918 in NV-RAM record list 914 points to NVRAM record list 922 and next record list 926 in NV-RAM record list 922 points to NV-RAM record list 930. Each NV-RAM record list is assigned a CRC (e.g. 920 and 928) for integrity checking.

There is one NV-RAM node record for each non-volatile memory node allocated by the NV-RAM memory manager. For example, NV-RAM node record 936 corresponds to node 980. The purpose of the NV-RAM node record is the give structure to the non-volatile memory. The memory can be viewed as a logical tree, where each node has a single parent node and possibly many child nodes. The logic tree structure allows for a non-volatile memory file system comprised of directories that may have associated sub-directories and files where directories, sub-directories and files are related to one another via the logic tree structure. The name 942 stored in the NV-RAM node record 936 allows the data stored in the non-volatile to be treated like a file in a computer file system. The non-volatile memory file system is described with reference to FIG. 12.

The NV-RAM node record also provides integrity information about each node by supplying a size of the node 944 and some additional flags 948 about the node. The status flags 948 indicate to the NV-RAM manager the type of non-volatile memory. These flags can include information such as whether the memory can be resized, moved, de-allocated, etc. Thus, the flags 948 may limit the function requests, as described above, that may applied to the node. Also, the flags can represent conditions that the client presented to the NV-RAM memory manager at the time of the allocation of the node. For example, an owner and a time stamp for the node may be included with the status flags 948. In one scenario, a client may ask the NV-RAM memory manager to allocate a node via a create/allocate function request and provide a function request modifier indicating that the node can not be resized by any client in the gaming system. By storing this information with the status flags 948, the NV-RAM manager can honor this request by the client. Thus, for instance, when a client later sends a resize function request to the NV-RAM manager to resize a node that can not be resized, as indicated by the status flag 948, the NV-RAM manager does perform the resize on the node.

The NV-RAM node record 936 is assigned a unique handle 938. The unique handle 938 is the value used to reference the node by the NV-RAM manager and clients. Clients accessing the NV-RAM memory manager will use this handle 938 to refer to a given non-volatile memory node (e.g. 980, 981 and 982). For instance, the handle 938 is used by the client when sending a read function request or a write function request to the NV-RAM manager. The NV-RAM node record 936 contains an owner handle 940 to its parent node. The owner handle is used to establish the tree logic of the file system. The only exception to this rule would be the root node which is the parent to all other nodes in memory and has no parent. This fact is known to the NV-RAM manager.

The NV-RAM node record contains a reference to a piece of non-volatile memory 946 that is the data for the node. All the previously described structures manage the structure and integrity the non-volatile memory block data associated with the node. The NVRAM node record 936 also contains a CRC 950 or other type of signature which is used to check the integrity of the NVRAM node record 936 during critical data transactions involving the node.

The data structures described above including the NV-RAM header 900, the NV-RAM record lists 914, 922 and 930 and the NV-RAM node record 936 are all stored in the non-volatile memory. They are stored using a NV-RAM manager to ensure the integrity of non-volatile memory and allow for recovery of information after a power loss i.e. clients are not allowed to directly access the memory but must go through the NV-RAM manager instead. For efficiency, a DRAM (or SDRAM) look-up list 932 is implemented. The list does not reside in the physical non-volatile memory. The DRAM look-up list 932 is constructed in volatile memory by the NV-RAM manager from the information in non-volatile memory. The list 932 provides a quick method for the NV-RAM manager to locate the non-volatile memory for a given node from the handle. After a power loss, the look-up list may be reconstructed by the NV-RAM manager.

To allow for dynamic allocation and de-allocation of non-volatile memory a non-volatile memory heap is implemented. The non-volatile memory heap manages the non-volatile memory blocks which are referred to as NV-RAM data 952 in the diagram. The non-volatile memory heap allocates all of the data structures described above in the physical non-volatile memory. The non-volatile memory heap does not organize memory as a tree or file system as may done using the NV-RAM record list 914 and NV-RAM node record 936. It simply manages a list of data blocks and knows which are occupied and which are free. It can allocate additional nodes and de-allocate existing nodes.

The term heap is a standard in the computing community. Most modern computer system use a heap for volatile memory management and most modern computer operating system support dynamic allocation and de-allocation from a volatile memory heap. However, the implementation of a heap memory structure for a state-based gaming software architecture may be quite complicated. The penalties to the gaming system performance associated with using a heap structure in conjunction with a state-based transaction system were not justifiable when slower microprocessors were employed in the gaming machine. Thus, in the past, a heap memory structure has not been implemented for non-volatile memory applications in gaming machines. Instead a fixed memory map structure which does not allow for dynamic allocation and de-allocation of the memory has typically been employed.

Many methods may be used to implement a heap memory structure. FIG. 9 is an example of one embodiment of a heap structure. The basic concept for all heap implementations is to provide a list of all blocks in memory. To keep track of the blocks they are typically linked together such that they refer to other blocks in memory. Thus, each block has a reference to the next allocated block and next available block. For instance, NV-RAM heap block 954 points to NVRAM heap block 968 as the next allocated block via a next allocated block reference 956 and NVRAM heap block 968 points to NVRAM heap block 972 as the next allocated block via a next allocated block reference 970. Also, NV-RAM heap block 954 points to NVRAM heap block 962 as a next available block via a next available block reference 958 and NVRAM heap block 962 points to NVRAM heap block 966 as a next available block via a next allocated block reference 964. NV-RAM data, such as NV-RAM data 960, is associated with each block and is stored after the next allocated block reference (e.g. 956) and the next available block reference (e.g. 958).

This particular method makes it simple to find an available node from any given node because the method also takes advantage of the relationship that each block has the next allocated reference and the next available reference stored just before the actual data in the block. In this embodiment, this structure simplifies and speeds up operations on nodes since once the starting data address for the node is known, the software can simply move its reference back in memory to the header. The header contains the next available and next free blocks. With this implementation it is simple to go from the NV-RAM data block (e.g. 960) to the next available block (e.g. 962).

One advantage of non-volatile memory allocation system over a fixed map system may involve gaming machine security. With the non-volatile memory allocation system, the memory locations of critical data may be constantly changing as memory locations are allocated and de-allocated in the non-volatile memory. In addition, using the function requests utilized with the non-volatile memory allocation system, the memory locations of critical data may be regularly shuffled. With a fixed map non-volatile memory system, the memory locations always remain constant. Thus, for a fixed map non-volatile memory system, one method for tampering with the gaming machine may be altering critical data stored within the non-volatile memory to produce a favorable result on the gaming machine. For example, the memory location where the amount of credits on the gaming machine is stored may be ascertained in some manner and then artificially manipulated to add credits to the gaming machine. With the non-volatile memory allocation system, this type of scenario for gaming machine tampering is much harder to implement because it may be very difficult to determine where a particular bit of critical data is stored in non-volatile memory.

Figure 10A:
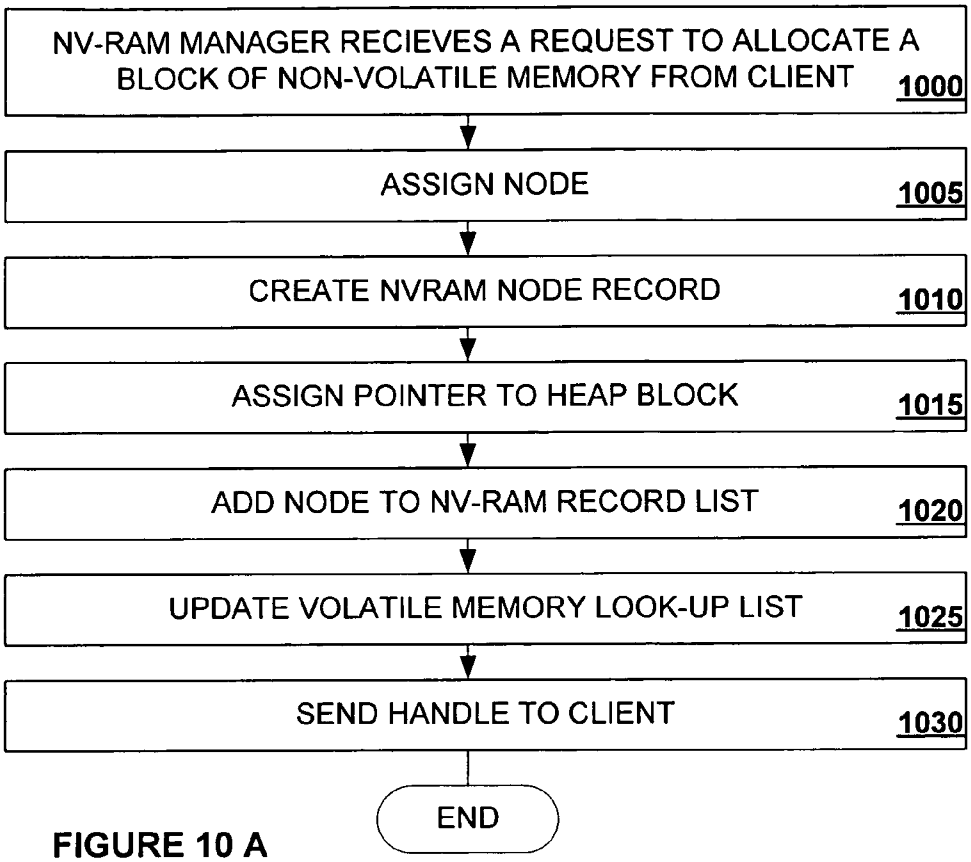
FIGS. 10A and 10B are flows charts of the non-volatile memory allocation and de-allocation processes utilizing the non-volatile memory allocation system described with reference to FIG. 9.
Figure 10B:
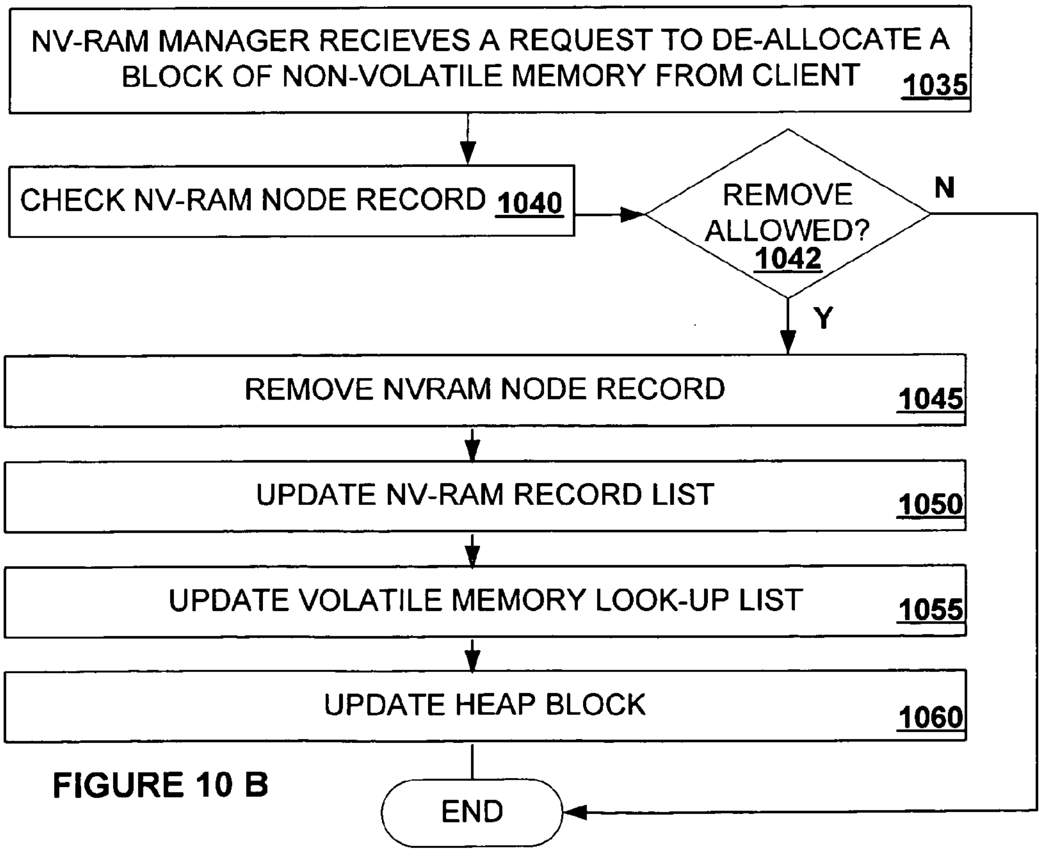

FIGS. 10A and 10B are flows charts of the non-volatile memory allocation and de-allocation processes utilizing the non-volatile memory allocation system described with reference to FIG. 9. In 1000, the NV-RAM manager receives an allocation function request from a client requesting a block of non-volatile memory. The allocation function request may contain a number of function request modifiers including 1) a size, 2) a name, 3) modification restrictions, 4) access restrictions, 5) an owner and 6) time stamp. In 1005, when the requested block of memory is available, the NV-RAM manager assigns a node to the block of memory requested. The node is used to point to the NV-RAM record from the NV-RAM record list. This structure allows for the non-volatile memory file system to be created which is described with reference to FIG. 12. In 1010, a NV-RAM node record is created. As described with reference to FIG. 9, the NV-RAM node record is assigned a unique handle that is used to access the node. Information regarding an owner handle, node name, size which were included with allocation function request are stored in the NV-RAM node record. In addition, status flags, obtained from function request modifiers sent with the allocate function request, may be stored in the record. For instance, a status flag restricting access to the node to a particular group of clients may be stored in the NV-RAM record (e.g. two or more clients may share a node corresponding to a block of memory). Finally, a CRC or some other signature may be generated and added to the NV-RAM record. The CRC may be checked by the NV-RAM manager when the NV-RAM record is subsequently accessed by the NV-RAM manager to ensure the integrity of the record.

In 1015, a pointer to the heap block is assigned to the NV-RAM node record. The heap block organizes the blocks of data in the non-volatile memory. In 1020, the node is added to a NV-RAM record list. All of the nodes maintained by the NV-RAM manager may be recorded in one of one or more NV-RAM record lists. In 1025, the handle corresponding to the created NV-RAM record is added to a volatile memory look-up list. The volatile memory look-up contains a list of all the handles to NV-RAM node records maintained by the NV-RAM manager. In the event of power failure, the volatile memory look-up list is lost but may be reconstructed by the NV-RAM manager when power is restored to the gaming machine. In 1030, the handle corresponding to the new node is returned to the client. The handle may be used by the client to access the node, e.g. to write data to the node, during subsequent function requests.

FIG. 10B is flow chart of a non-volatile memory de-allocation process. In 1035, the NV-RAM manager receives a de-allocation function request from a client to de-allocate a block of non-volatile memory. A de-allocation function request may be initiated by the client when a block of non-volatile memory is needed temporarily. For instance, when a state is executed by the event manager, a list of operations comprising the state are stored in the non-volatile memory. After the execution of the state has been completed, the list of operations may no longer be needed and the non-volatile associated with the list may be de-allocated.

In 1040, the NV-RAM manager locates the NV-RAM node record by the handle included in the de-allocation function request. In 1042, the NV-RAM manager determines whether the remove is allowed based upon the status flags contained within the NV-RAM node record. For instance, a status flag may indicate that a node may not be removed or a status flag may indicate that only particular clients have permission to remove the node. When de-allocation function request by the client is invalid, the NV-RAM manager ends the de-allocation process.

In 1045, when the de-allocation function request is valid, the NV-RAM manager may remove the node record. In 1050, the NV-RAM manager locates the NV-RAM record list containing the node and updates the NV-RAM record list by removing the node from the list. In 1055, the volatile memory look-up list containing the handle corresponding to the node is updated by removing the handle from the look-up list. In 1060, the heap block is update freeing up the non-volatile memory associated with the node for subsequent utilization by the gaming machine operating software.

Figure 11:
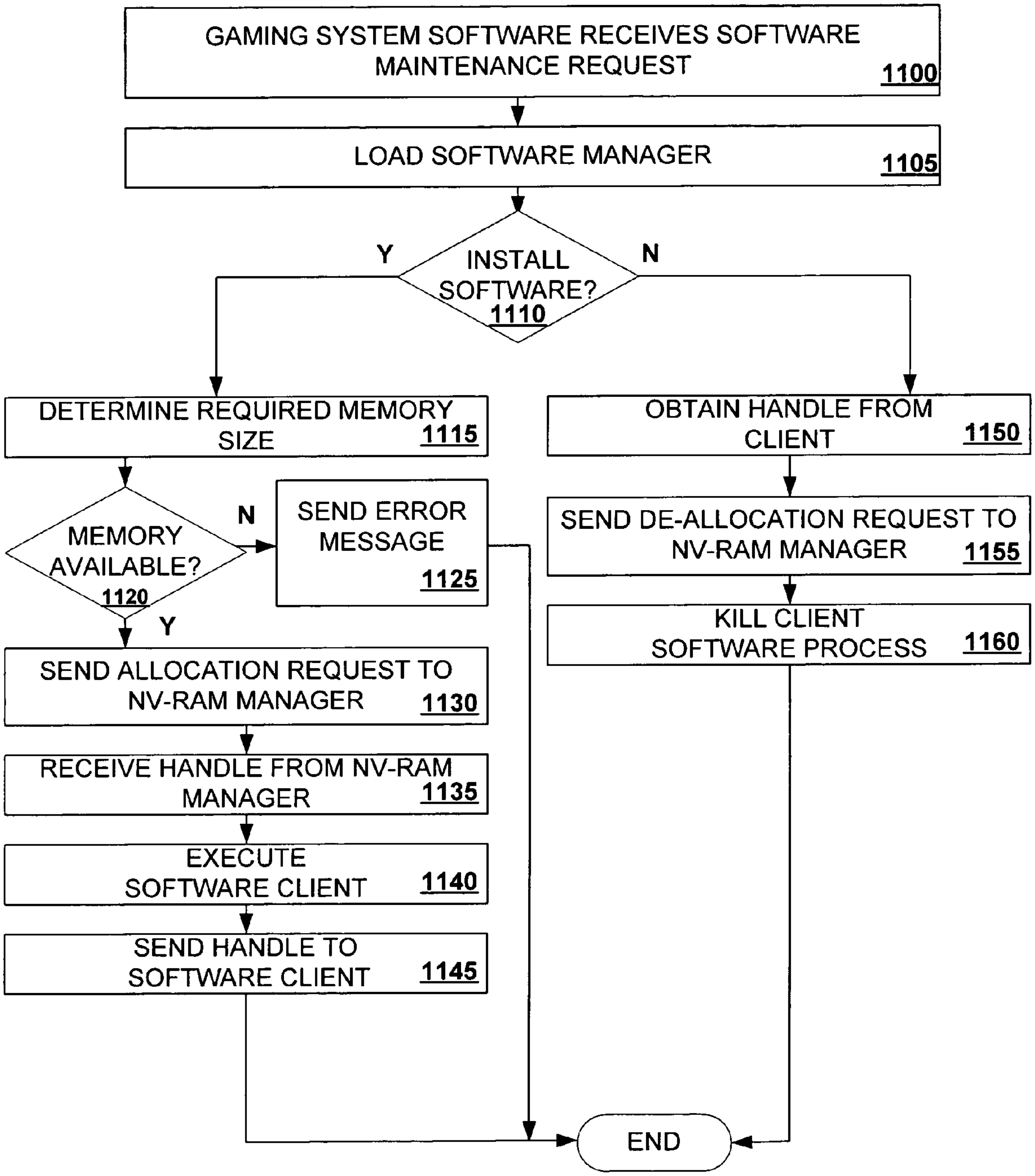
FIG. 11 is a flow chart of the software maintenance process involving the non-volatile memory allocation system.

FIG. 11 is a flow chart of a non-volatile memory software maintenance process involving the non-volatile memory allocation system. The non-volatile memory software maintenance process may include installing or removing software from the gaming system software and re-configuring the non-volatile memory. As the new software is installed, the new software or a separate process on the gaming system software, such as a software load manager that is activated when new software is installed on the gaming machine, may request the NV-RAM manager to allocate the non-volatile memory it needs to operate. The software load manager may also be utilized when software utilizing non-volatile memory is removed from the gaming machine allowing the non-volatile memory utilized by the software to be made available.

In 1100, the gaming system software receives a software maintenance request for software that utilizes the non-volatile memory on the gaming machine. In one embodiment, the software maintenance request may be initiated when a gaming machine technician downloads new software into the gaming machine by inserting a CD-ROM into the gaming machine containing the software. In another embodiment, the software maintenance request may be initiated when a player selects a game for game play from one or more games available on the gaming machine. In 1105, the gaming machine executes a software load manager to handle the load process. The software load manager is not necessarily required for the software maintenance process. The functions of the software load manager may also be incorporated into the software that is being modified on the gaming machine. In 1110, the software load manager determines whether new software is being installed on the gaming machine or being removed from the gaming machine.

When new software is being installed, in 1115, the software load manager determines an amount of non-volatile memory required by the software. In 1120, the software load manager determines whether the required non-volatile memory is available. The available memory may be determined by using the get statistics function request described with reference to FIG. 9. In some embodiments, the non-volatile memory may be sufficiently utilized by existing software on the gaming machine such that the amount of requested non-volatile memory is unavailable. When the required memory is unavailable, the software load manager may send an error message in 1125 and then terminates the load process. In 1130, when the required memory is available, the software load manager may send one or more allocation function requests to the NV-RAM manager and the NV-RAM manager may execute the requests as described with reference to FIG. 10A. One or more allocation requests may be required because the software being installed may need more than one separately addressable blocks of non-volatile memory and each of these blocks may have different sizes and access privileges.

In 1135, the software load manager may receives one or more handles associated with the allocated memory from the NV-RAM manager. In 1140, the software load manager may execute the software client i.e. initialize the software on the gaming machine and then, in 1145, send the handles corresponding to the requested non-volatile memory to the software client.

In 1150, when software is being removed from the gaming machine, the software load manager may obtain one or more handles from the software client for non-volatile memory utilized by the client software. In 1155, the software load manager may send one or more de-allocation requests to the NV-RAM manager corresponding to the handles obtained from the software client. The software load manager determine the status of each handle to determine whether the memory is shared by other clients and thus only de-allocate memory that may no longer be used by the gaming machine software. In another embodiment, using the non-volatile memory file system, the non-volatile memory may be de-allocated by removing a directory with files corresponding to the non-volatile memory used by the software that is being removed. For instance, when the software was installed, one or more directory containing a number of non-volatile memory files used by the software may have been created. Thus, when the one or more directories are removed from the non-volatile memory file system, the non-volatile memory associated with each file is de-allocated. In 1160, after de-allocating the memory, the software load manger may kill the client software process and uninstall the software.

When the gaming machine is operating with an existing set of software, an advantage of the non-volatile memory allocation system 990, described with reference to FIG. 9, which allows non-volatile memory to be dynamically allocated and de-allocated, may be simpler software upgrades and installations. The ability to dynamically allocate and de-allocate memory in many cases allows new software to be installed on the machine without disturbing existing software or non-volatile memory of the existing software. Thus, the software maintenance process may enable real-time updates of gaming machine software. For instance, the software maintenance process may be used to enable different games residing on a game server located outside the gaming machine to be downloaded and executed in real-time without user intervention. In a gaming system using a fixed map of non-volatile memory, software upgrades involving software utilizing the non-volatile memory often requires a re-initialization of the non-volatile memory before the new software can be executed. The re-initialization process is typically time consuming and requires intervention by a gaming machine technician which precludes real-time software upgrades providing a game server.

Figure 12:
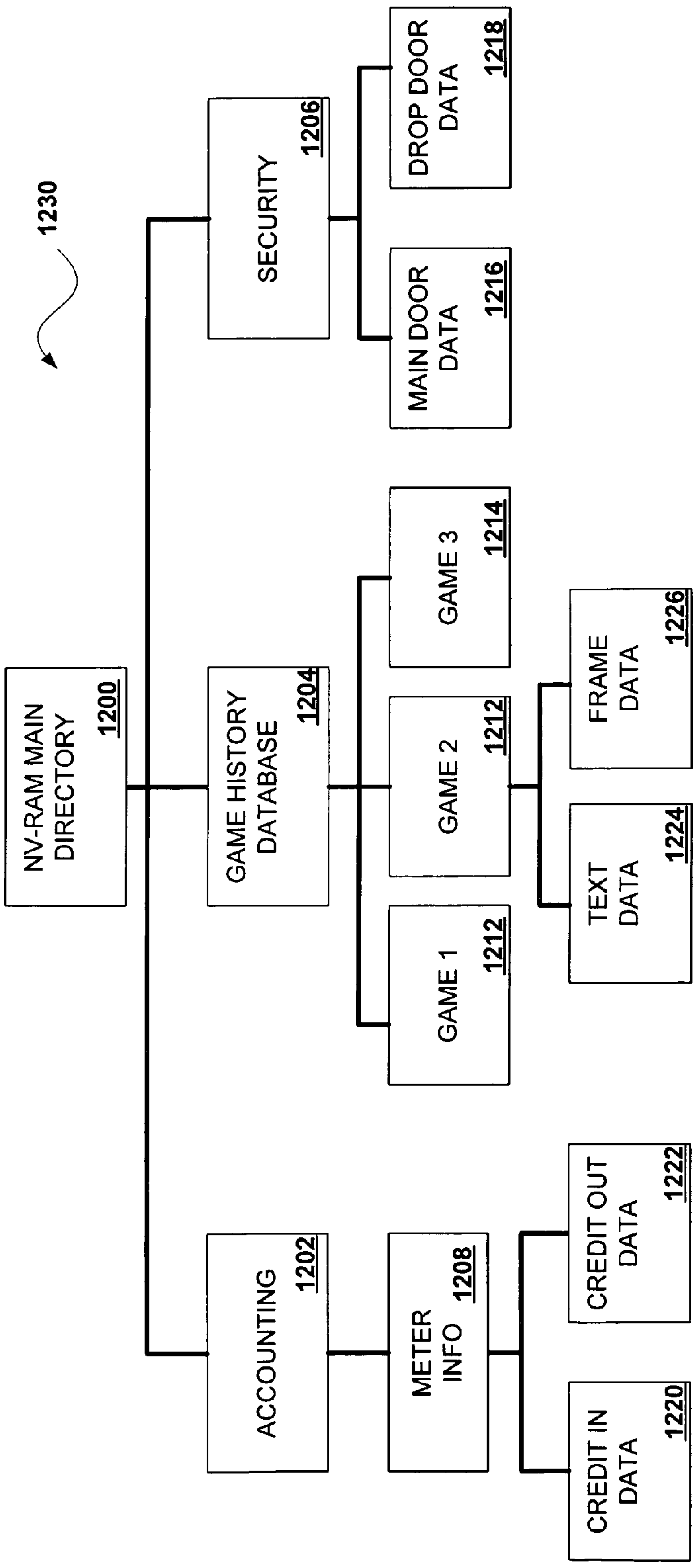
FIG. 12 is a block diagram of non-volatile memory file system based upon the non-volatile memory allocation system implemented with the NV-RAM manager.

FIG. 12 is a block diagram of non-volatile memory file system based upon the non-volatile memory allocation system implemented with the NV-RAM manager. Using the non-volatile memory nodes and other data structures implemented in the NV-RAM manager as part of the non-volatile memory allocation system as described with reference to FIG. 9, a non-volatile memory file system 1230 may be constructed. The memory structure in the non-volatile memory file system 1230 may be organized in a tree hierarchy in a manner essentially equivalent to a standard computer file system. Typically, data organized on a hard drive, floppy drive or CD-ROM drive connected to the gaming machine appears as files and directories (or folders) to the gaming machine operating system. In the same manner, critical data stored in the non-volatile memory file system may appear as directories (or folders) and files to the gaming machine operating system.

Data stored in non-volatile memory may be viewed by standard operating system and application tools. Like files stored on a standard computer file system, both the file structure of the non-volatile memory and the contents may be viewed. For example, the file structure may be viewed with a an operating system browser of some type and a block of critical data stored in a "file" may be viewed with a word processor such as Microsoft Word (Microsoft, Redmond, Wash.). In general, files may be viewed with text editors, binary editors or data editor of any type. Thus, developers may modify and view the contents of non-volatile memory with standard file editing software. In addition, the blocks of non-volatile memory appearing as files in the non-volatile memory file system can be copied, removed, renamed or resized just as any file on a hard drive. Further, files in the non-volatile memory file system may be assigned operating system permissions, use operating system compression utilities and utilize other operating file system features that work with file systems. For instance, using non-volatile memory file system commands, files and folders may be renamed, moved, added and deleted.

An example of the non-volatile memory file structure populated with various folders and files that may be stored in the non-volatile memory using the non-volatile memory allocation system and viewed by the gaming machine operating system is described as follows. The top folder is the NV-RAM main directory 1200. A number folders containing different categories of gaming information including accounting 1212, game history preservation 1204 and security 1206 are located under the main directory 1200. Information on accounting, game history preservation and security are typically stored in the non-volatile memory. A meter information folder 1208 is located under the accounting folder 1202. Two data files, "credits in" 1220 and "credits out" 1222 are located in the meter information folder. The "credits in" 1220 file may contain information regarding credits deposited into the gaming machine. During operation of the gaming machine when credits are deposited into the machine, this file might be regularly updated with credit information and polled by an accounting server as described with reference to FIG. 2. The "credits out" file 1222 may contain information regarding credits dispensed from the gaming machine. It might also be regularly updated during operation of the gaming machine and polled by the accounting server.

The game history database 1204 may be recalled from the non-volatile memory files system during a game dispute. In one embodiment using the non-volatile file system 1230, a game history database and its folders associated with different previous games on the gaming might appear on the display screen of the gaming machine. With the different games displayed, an attendant may select the game in dispute and display game history data for that game. For instance, the attendant may select game 2 and then view text data 1224 for the game 2 history using a word processor on the gaming machine or the attendant may view the frame data 1226 for game 2, which contains a visual game history, using a graphics utility on the gaming machine.

The security folder 1206 may be viewed after the gaming machine has recorded a security violation. For instance, the main door of the gaming may have been illegally opened. When the security violation is investigated, the security folder may be displayed on the main display of the gaming machine. Using a word processor, a person investigating the security violation may view the contents of the main door data file 1216 or the drop door data file 1218. For a main door security violation, information relating to the violation may be contained in the main door data file.

For modern gaming machines with complex games using more non-volatile memory functions and given trends in the gaming industry to expand the game development community, the software development environment is an important consideration. The capabilities of the non-volatile memory file system may simplify and accelerate the gaming software development process. Compared to a non-volatile memory system that is strictly blocks of memory, using the non-volatile memory system provided with the current invention, a developer may more easily experiment with different memory configurations and quickly simulate problems while troubleshooting and designing game code.

Figure 13:
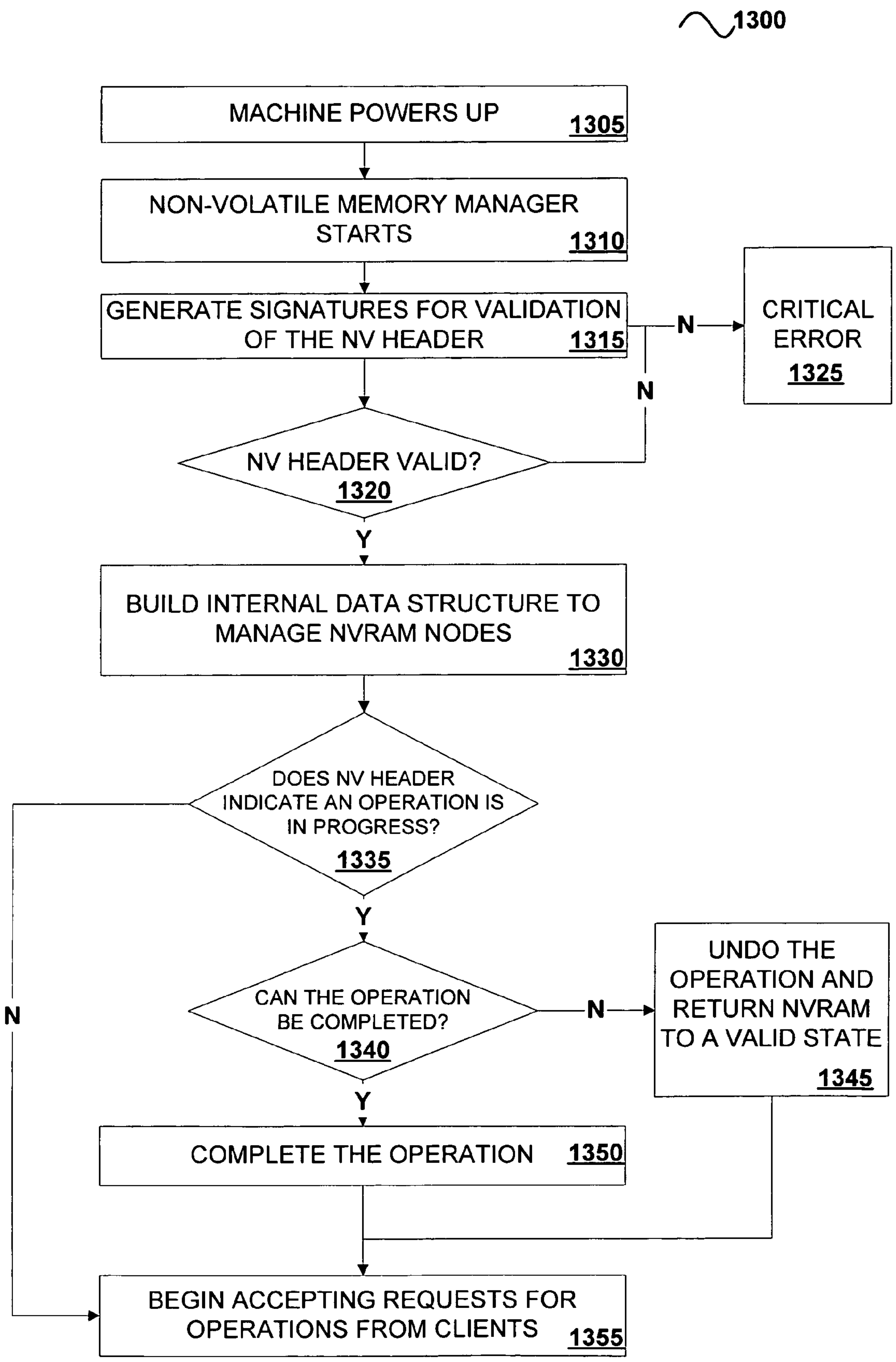
FIG. 13 is a flow chart of the power-up process involving the non-volatile memory in the gaming machine after a power failure.

FIG. 13 is a flow chart of the power-up process 1300 in the gaming machine involving the non-volatile memory after a power failure. In 1305, power is restored to the gaming machine and the gaming machine may institutes an initialization process for a number of gaming systems including the NV-RAM manager. The power may have been lost from the gaming machine as a result of a power failure or maintenance on the gaming machine. In 1310, from a configuration file, the gaming machine starts running the NV-RAM manager. In 1315, the NV-RAM manager generates one or more signatures for the NV-RAM header (described with reference to FIG. 9) a CRC, Checksum, hash value or some other method. In 1320, when the one or more signatures generated for the NV-RAM header do not compare with the signatures stored in the NV-RAM header, a critical error may have occurred such as tampering or a hardware malfunction and the gaming machine enters a tilt mode in 1325. In 1330, when the generated and stored signatures compare, the NV-RAM manager builds internal data structures to manage the NV-RAM nodes. For instance, the NV-RAM manager, as described with reference to FIG. 9, constructs a look-up list in the non-volatile memory.

In 1335, the NV-RAM manager checks the current operation information stored in the NV-RAM header to determine whether an operation was in progress when the power was lost to the gaming machine. When an operation was not in progress, for instance as a result of a planned shutdown of the gaming machine, the NV-RAM manager may begin accepting requests for operation (e.g. function requests) from clients. In 1340, when the NV-RAM header indicates that an operation was in progress, the NV-RAM manager determines whether the operation may be completed. When the operation may be completed, the NV-RAM manager completes the operation in 1350. For instance, when the NV-RAM manager was in the process of re-naming a file but the power was lost prior to completion of the operation, the NV-RAM manager may rename the file to complete the operation. In 1345, when the operation may not be completed, the NV-RAM manager "rolls back" the operation and returns the NV-RAM to a valid state prior to the execution of the operation stored in the NV-RAM header. In 1355, after the operations stored in the NV-RAM header are either executed or "rolled back", the NV-RAM manager may begin accepting requests for operation from clients.

A "roll back" may scenario may be described as follows. The gaming software decides to start a game. After an initial determination that a game can start, a list of transactions may be built. The list of transactions may include: 1) record the game to be played, 2) recording the new state of the game, 3) recording the amount of money to be played, 4) recording the amount of money to be subtracted from the players money and 5) notifying the event manager that a game has begun. Normally, these operations would all be completed at once. However, due to the dynamic nature of the system, it is possible that at the last moment, the game can not begin. For instance, an eminent power interruption may prevent the game from beginning. In this example, when the gaming software notifies the event manager that a game is about to be initiated, it may receiving a reply from the operating system not to initiate the game (e.g. power failure detected). In this example, the operations in the transaction list that have been recorded for execution were based upon the assumption that a game would be initiated. If the operations are executed and a game is not initiated, the gaming machine may be left in an incorrect state. For instance, subtracting the player money without initiating a game would be unacceptable to the player or the operator of the gaming machine. Thus, in response to the denial of game play, all the operations are rolled backed. Thus, none of the operations are executed on the transaction list, a game is not played, and the gaming machine is placed in a state before the transaction list was constructed in anticipation of a game play.

Although the foregoing invention has been described in some detail for purposes of clarity of understanding, it will be apparent that certain changes and modifications may be practiced within the scope of the appended claims. For instance, while the gaming machines of this invention have been depicted as having top box mounted on top of the main gaming machine cabinet, the use of gaming devices in accordance with this invention is not so limited. For example, gaming machine may be provided without a top box.

What is claimed is:

1. A method of allocating non-volatile memory locations on a gaming machine, the method comprising:

executing gaming software for generating a play of a wager-based game, said gaming software including a non-volatile memory allocation system wherein the non-volatile memory allocation system is operable to dynamically allocate and de-allocate non-volatile memory locations in a non-volatile memory and wherein the non-volatile allocation system is operable to allow the non-volatile memory locations where critical data is stored to vary over time such that the critical data stored in first non-volatile memory locations at a first time is movable to second non-volatile memory locations at a second time;

receiving a wager on an outcome to the wager-based game wherein the wager is associated with an amount of cash or an indicia of credit;

determining the outcome to the wager-based game;

presenting the outcome to the wager-based game;

receiving a request at the non-volatile memory system from a client to allocate a block of non-volatile memory locations in the non-volatile memory;

assigning a node to the block of non-volatile memory;

creating an NV-RAM node record;

assigning a pointer to a heap block;

sending a handle corresponding to the block of non-volatile memory to the client;

wherein the handle allows the client to subsequently access the non-volatile memory using the non-volatile memory access system;

copying critical data generated during the play of the wager-based game that is stored in a first volatile memory location to the block of non-volatile memory wherein the gaming machine is operable to determine whether a transfer of the critical data is complete; and comparing the critical data originally stored in the first volatile memory to a copy of the critical data stored in the non-volatile memory to determine a validity of the copy of the critical data.

2. The method of claim 1, further comprising:

adding the assigned node to an NV-RAM node record list.

3. The method of claim 1, further comprising:

updating a volatile memory look-up list.

4. The method of claim 1, further comprising:

determining an amount of memory available in the non-volatile memory;

comparing the amount of memory available in the non-volatile memory with an amount of non-volatile memory in the requested block; and when the amount of requested non-volatile memory exceeds the available amount of non-volatile memory, terminating the non-volatile memory request.

5. The method of claim 1, further comprising:

sending critical data with the non-volatile memory allocation request to the non-volatile memory allocation system.

6. The method of claim 5, wherein the critical data is selected from the group consisting of game history information, security information, accounting information, player tracking information, wide area progressive information and game state information.

7. The method of claim 1, wherein the NV-RAM node record includes a handle, an owner handle, a name, a size, a pointer to the heap block, one or more status flags and a signature.

8. The method of claim 7, wherein the one or more status flags is selected from the group consisting of a time stamp, an access restriction and a resizing restriction.

9. The method of claim 1, further comprising:

generating a signature for the NV-RAM node record.

10. The method of claim 9, wherein the signature is generated using a method selected from the group consisting of a CRC, Checksum and a hash value.

11. A method of modifying non-volatile memory locations in a gaming machine, the method comprising:

executing gaming software for generating a play of a wager-based game, said gaming software including a non-volatile memory allocation system wherein the non-volatile memory allocation system is operable to dynamically allocate and de-allocate non-volatile memory locations in a non-volatile memory and wherein the non-volatile allocation system is operable to allow the non-volatile memory locations where critical data is stored to vary over time such that the critical data stored in first non-volatile memory locations at a first time is movable to second non-volatile memory locations at a second time;

receiving a wager on an outcome to the wager-based game wherein the wager is associated with an amount of cash or an indicia of credit;

determining the outcome to the wager-based game;

presenting the outcome to the wager-based game;

receiving a function request at the non-volatile memory system from a client wherein the function request includes a handle corresponding to allocated memory locations and a one or more function request modifiers;

locating a NV-RAM node record corresponding to the handle;

checking the status flags contained in the NV-RAM node record; and when the status flags allow the function request, executing the function request;

copying critical data generated during a play of the game of chance that is stored in a first volatile memory location to the allocated memory locations wherein the gaming machine is operable to determine whether a transfer of the critical data is complete; and comparing the critical data originally stored in the first volatile memory to a copy of the critical data stored in the non-volatile memory to determine a validity of the copy of the critical data.

12. The method of claim 11, wherein the function request is selected from the group consisting of de-allocate, open, close, read, read/directory, write, resize, move, get statistics and change statistics.

13. The method of claim 11, wherein the function request modifier is selected from the group consisting of a requested size, a name, a modification restriction, an access restriction, an owner and a time stamp.

14. The method of claim 11, further comprising:

when the function request is a de-allocate function request, removing the NV-RAM node record;

updating an NV-RAM record list; and updating a heap block.

15. The method of claim 14, further comprising:

updating a volatile memory look-up list.

16. A method of providing a new client utilizing g non-volatile memory on a gaming machine, the method comprising:

executing gaming software for providing a play of a wager-based game, said gaming software including a non-volatile memory allocation system wherein the non-volatile memory allocation system is operable to dynamically allocate and de-allocate the non-volatile memory locations in a non-volatile memory and wherein the nonvolatile allocation system is operable to allow the non-volatile memory locations where critical data is stored to vary over time such that the critical data stored in first non-volatile memory locations at a first time is movable to second non-volatile memory locations at a second time;

receiving a wager on an outcome to the wager-based game wherein the wager is associated with an amount of cash or an indicia of credit;

determining the outcome to the wager-based game;

presenting the outcome to the wager-based game;

determining an amount of non-volatile memory required by the new client wherein the new client is component of the gaming software used to provide the play of the wager-based game on the gaming machine;

sending an allocation function request to the non-volatile memory allocation system requesting the required amount of non-volatile memory;

receiving a handle from the non-volatile memory allocation system wherein the handle allows subsequent access to the requested non-volatile memory;

executing the new client;

sending the handle to the new client;

copying critical data generated during a play of the game of chance that is stored in a first volatile memory location to the non-volatile memory associated with the handle wherein the gaming machine is operable to determine whether a transfer of the critical data is complete; and comparing the critical data originally stored in the first volatile memory to a copy of the critical data stored in the non-volatile memory to determine a validity of the copy of the critical data.

17. The method of claim 16, further comprising:

determining when the required amount of non-volatile is available in the non-volatile memory; and when the required amount of memory is not available, sending an error message.

18. The method of claim 16, wherein the allocation function request includes in one or more function request modifiers.

19. The method of claim 18, wherein the function request modifiers are selected from the group consisting of a name, a modification restriction, an access restriction, an owner and a time stamp.

20. The method of claim 16, further comprising:

loading a software load manager that manages an installation of the new client.

21. A method of removing a client that uses non-volatile memory on a gaming machine, the method comprising:

executing gaming software for providing a play of a wager-based game, said gaming software including a non-volatile memory allocation system wherein the non-volatile memory allocation system is operable to dynamically allocate and de-allocate non-volatile memory locations in a non-volatile memory and wherein the non-volatile allocation system is operable to allow the non-volatile memory locations where critical data is stored to vary over time such that the critical data stored in first non-volatile memory locations at a first time is movable to second non-volatile memory locations at a second time;

receiving a wager on an outcome to the wager-based game;

determining the outcome to the wager-based game;

presenting the outcome to the wager-based game;

copying critical data generated during a play of the wager-based game that is stored in a first volatile memory location to non-volatile memory associated with one or more handles wherein the gaming machine is operable to determine whether a transfer of the critical data is complete;

determining the client is to be removed;

determining the one or more handles are associated with the client;

sending one or more de-allocation requests to the non-volatile memory allocation system; and removing the client.

22. The method of claim 21, further comprising:

loading a software load manager that manages a removal of the client from the gaming machine.

23. The method of claim 21, further comprising:

initiating the one or more de-allocation requests by deleting one or more files in a non-volatile memory file system wherein the one or more files are utilized by the client.

* * * * *

UNITED STATES PATENT AND TRADEMARK OFFICE
CERTIFICATE OF CORRECTION

PATENT NO. : 7,412,559 B2
APPLICATION NO. : 10/912262
DATED : August 12, 2008
INVENTOR(S) : James W. Stockdale et al.

It is certified that error appears in the above-identified patent and that said Letters Patent is hereby corrected as shown below:

CLAIMS:

1. In line 18 of claim 1 (column 37, line 14) change "outcome to" to --outcome of--.

2. In line 19 of claim 1 (column 37, line 15) change "outcome to" to --outcome of--.

3. In line 23 of claim 11 (column 38, line 28) delete "a" before one.

4. In line 1 of claim 16 (column 38, line 59) delete "g" after utilizing.

5. In line 19 of claim 16 (column 39, line 10) change "to" to --of--.

6. In line 20 of claim 16 (column 39, line 11) change "to" to --of--.

7. In line 2 of claim 17 (column 39, line 34) change "non-volatile" to --memory--.

8. In line 2 of claim 18 (column 39, line 39) delete "in" after includes.

9. In line 15 of claim 21 (column 40, line 19) change "to" to --of--.

10. In line 16 of claim 21 (column 40, line 20) change "to" to --of--.

Signed and Sealed this

Twenty-eighth Day of September, 2010

David J. Kappos

*Director of the United States Patent and Trademark Office*